US012806908B2

(12) United States Patent
Okazaki et al.

(10) Patent No.: US 12,806,908 B2
(45) **Date of Patent: *Nov. 24, 2026**

(54) LIQUID SUPPLYING APPARATUS

(71) Applicant: BROTHER KOGYO KABUSHIKI KAISHA, Nagoya (JP)

(72) Inventors: Naoya Okazaki, Hashima (JP); Satoru Oki, Nagoya (JP); Nanami Abe, Niigata (JP); Masahiro Hayashi, Nishio (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 19/057,190

(22) Filed: Feb. 19, 2025

(65) Prior Publication Data

US 2025/0282143 A1 Sep. 11, 2025

Related U.S. Application Data

(63) Continuation of application No. 17/823,170, filed on Aug. 30, 2022, now Pat. No. 12,257,843.

(30) Foreign Application Priority Data

Aug. 31, 2021 (JP) ................................ 2021-141929

(51) Int. Cl.
*B41J 2/175* (2006.01)

(52) U.S. Cl.
CPC .................................... *B41J 2/175* (2013.01)

(58) Field of Classification Search
CPC .............................. B41J 2/17593; B41J 2/175
USPC .............. 141/346, 347, 363–366; 347/85, 86
See application file for complete search history.

(56) References Cited

U.S. PATENT DOCUMENTS

| | | | |
|---|---|---|---|
| 4,907,019 | A | 3/1990 | Stephens |
| 8,708,470 | B1 | 4/2014 | Blowfield et al. |
| 10,369,800 | B2 | 8/2019 | Rooney et al. |
| 10,427,412 | B2 | 10/2019 | Okude et al. |
| 11,318,748 | B2 | 5/2022 | Mizutani et al. |
| 11,584,132 | B2 | 2/2023 | Nagai et al. |

(Continued)

FOREIGN PATENT DOCUMENTS

| | | | |
|---|---|---|---|
| CN | 2325210 | Y | 6/1999 |
| CN | 107487084 | A | 12/2017 |

(Continued)

*Primary Examiner* — Timothy L Maust
(74) *Attorney, Agent, or Firm* — Merchant & Gould P.C.

(57) ABSTRACT

There is provided a liquid supplying apparatus including: a liquid container including an internal space, and a tank having a storing chamber. The liquid container has: an upper surface, a nozzle, and a circular wall projecting upward from the upper surface. The tank has: a body; a projecting wall defining a tank recessed part, and a communicating tube positioned in the tank recessed part and having first and second channels which communicate the storing chamber with outside. The circular wall is inserted into the tank recessed part, and the communicating tube is inserted into the opening of the nozzle so as to allow the liquid to flow out from the internal space to the storing chamber. In a case that the liquid container is connected to the tank, the circular wall is positioned inside the projecting wall.

13 Claims, 12 Drawing Sheets

(56) References Cited

U.S. PATENT DOCUMENTS

| | | | | |
|---|---|---|---|---|
| 11,673,405 | B2 * | 6/2023 | Maruyama | B41J 2/17596 347/85 |
| 12,257,843 | B2 * | 3/2025 | Okazaki | B41J 2/17506 |
| 2003/0038865 | A1 | 2/2003 | Inamura | |
| 2003/0197765 | A1 | 10/2003 | Dod et al. | |
| 2010/0314350 | A1 | 12/2010 | Sewell | |
| 2011/0197991 | A1 | 8/2011 | Ender et al. | |
| 2017/0355191 | A1 | 12/2017 | Mizutani et al. | |
| 2018/0111382 | A1 | 4/2018 | Kawagoe et al. | |
| 2019/0030903 | A1 | 1/2019 | Fukaswa et al. | |
| 2019/0039381 | A1 | 2/2019 | Ishizawa et al. | |
| 2019/0299624 | A1 * | 10/2019 | Mizutani | B41J 2/17553 |
| 2020/0276825 | A1 | 9/2020 | Shimizu et al. | |
| 2022/0016894 | A1 | 1/2022 | Nagaoka et al. | |

FOREIGN PATENT DOCUMENTS

| | | | |
|---|---|---|---|
| CN | 107972362 | A | 5/2018 |
| CN | 109138598 | A | 1/2019 |
| CN | 109318598 | A | 2/2019 |
| CN | 111746139 | A | 10/2020 |
| CN | 111976296 | A | 11/2020 |
| CN | 113291065 | A | 8/2021 |
| CN | 113942310 | A | 1/2022 |
| JP | 2003-53996 | A | 2/2003 |
| JP | 2004-338131 | A | 12/2004 |
| JP | 2010-228421 | A | 10/2010 |
| JP | 2017-52122 | A | 3/2017 |
| JP | 2017-222152 | A | 12/2017 |
| JP | 2018-62372 | A | 4/2018 |
| JP | 2018-75729 | A | 5/2018 |
| JP | 2018-134830 | A | 8/2018 |
| JP | 2019-25782 | A | 2/2019 |
| JP | 2019-25862 | A | 2/2019 |
| JP | 2019-93669 | A | 6/2019 |
| JP | 2020-189456 | A | 11/2020 |
| JP | 2021-70256 | A | 5/2021 |
| JP | 2022-18712 | A | 1/2022 |
| JP | 2022-18869 | A | 1/2022 |
| KR | 10-2005-83509 | A | 8/2005 |
| TW | 389166 | U | 5/2000 |

* cited by examiner

LIQUID SUPPLYING APPARATUS

REFERENCE TO RELATED APPLICATIONS

This application is a continuation of U.S. patent application Ser. No. 17/823,170, filed Aug. 30, 2022, now U.S. Pat. No. 12,257,843, which further claims priority from Japanese Patent Application No. 2021-141929 filed on Aug. 31, 2021. The entire content of both applications is incorporated herein by reference.

BACKGROUND ART

There is a publicly known ink supplying apparatus wherein an ink is supplied to a tank from a liquid container in a so-called chicken feed system, as a configuration capable of maintaining a liquid surface of the ink stored in the tank to be constant, by supplying the ink successively to the tank from a liquid container connected to the tank every time the ink stored in the tank is consumed.

In a certain publicly known ink supplying apparatus, the liquid container is connected to the tank from thereabove. The tank is provided with an air introducing part communicating with the atmosphere. The liquid container is provided with an ink outflow pipe and an air inflow pipe. In a state that the liquid container is connected to the tank, the liquid container and the tank are communicated with each other via the ink outflow pipe and the air inflow pipe. In a case that the ink inside the tank is consumed and that the liquid surface of the ink becomes to be lower than a forward end part of the air inflow pipe, the air enters from the air introducing part into the tank, and the air entered into the tank enters into the liquid container via the air inflow pipe. Then, the ink of which amount corresponds to the volume of the air entered into the liquid container is supplied from the liquid container to the tank, via the ink outflow pipe. In a case that the liquid surface of the ink reaches the forward end part of the air inflow pipe, the supply of the ink is stopped. In such a manner, the liquid surface of the ink inside the tank is maintained to be constant.

In a case that the ink is supplied from the liquid container to the tank, there is such a fear that the ink might adhere to a part, of the tank, at which the liquid container is connected to the tank and that the adhered ink might flow down along the outer circumferential surface of the tank. As a result, there arises such a problem that the outer circumferential surface of the tank and/or the inside of the ink supplying apparatus might be dirtied by the ink.

DESCRIPTION

The present disclosure has been made in view of the circumstances described above, and an object of the present disclosure is to provide a liquid supplying apparatus wherein a liquid is less likely to flow down along the outer surface of a tank to which a liquid storing liquid container is connected According to an aspect of the present disclosure, there is provided a liquid supplying apparatus including: a liquid container in which an internal space configured to store a liquid is formed; and a tank having a storing chamber configure to store the liquid. The liquid container has: an upper surface, a nozzle projecting upward from the upper surface and having an opening formed in a forward end surface of the nozzle, and a circular wall (an annular wall) which is positioned in a surrounding of the nozzle with a spacing distance from the nozzle, and which projects upward from the upper surface. The tank further has: a body; a projecting wall which projects from an upper surface of the body and which defines a tank recessed part, and a communicating tube which is positioned in the tank recessed part and which has a first channel and a second channel communicating the storing chamber with outside. The circular wall of the liquid container is inserted into the tank recessed part, and the communicating tube of the tank is inserted into the opening of the nozzle of the liquid container to thereby connect the liquid container to the storing chamber of the tank so as to allow the liquid to flow out from the internal space of the liquid container to the storing chamber of the tank. In a connected state in which the liquid container is connected to the tank, the circular wall is positioned at an inner side with respect to the projecting wall.

In the tank, the liquid accumulated in the tank recessed part does not flow down along the outer circumferential surface of the body of the tank.

Figure 3A:
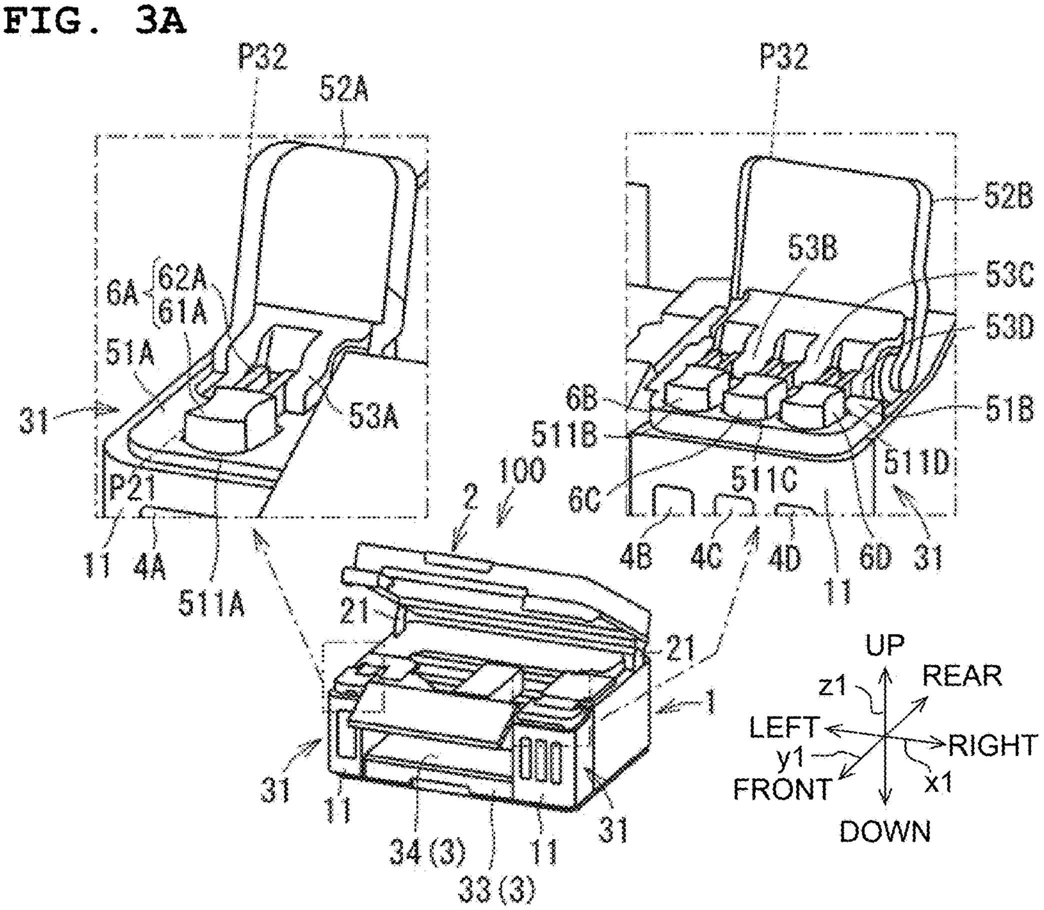
Figure 3B:
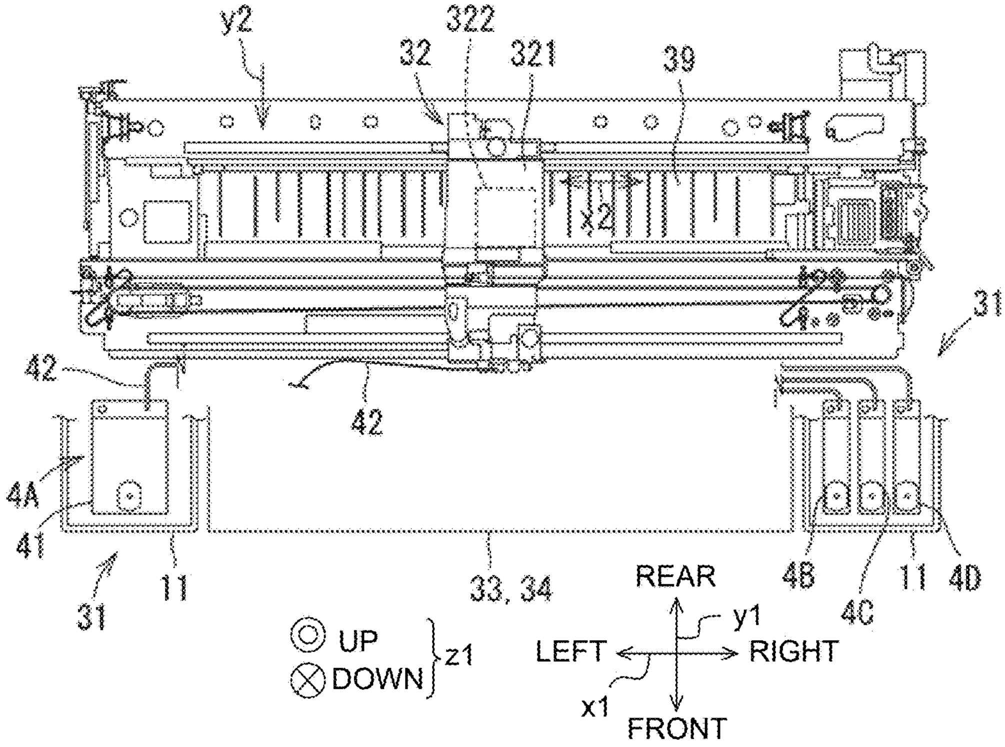

FIG. 3A is a perspective view of a tank set 31 in a case that caps 6A to 6D are each at a closing position P21, and FIG. 3B is a plan view schematically depicting the tank set 31, a recording part 32 and the peripheral structure of the recording part 32.

Figure 4A:
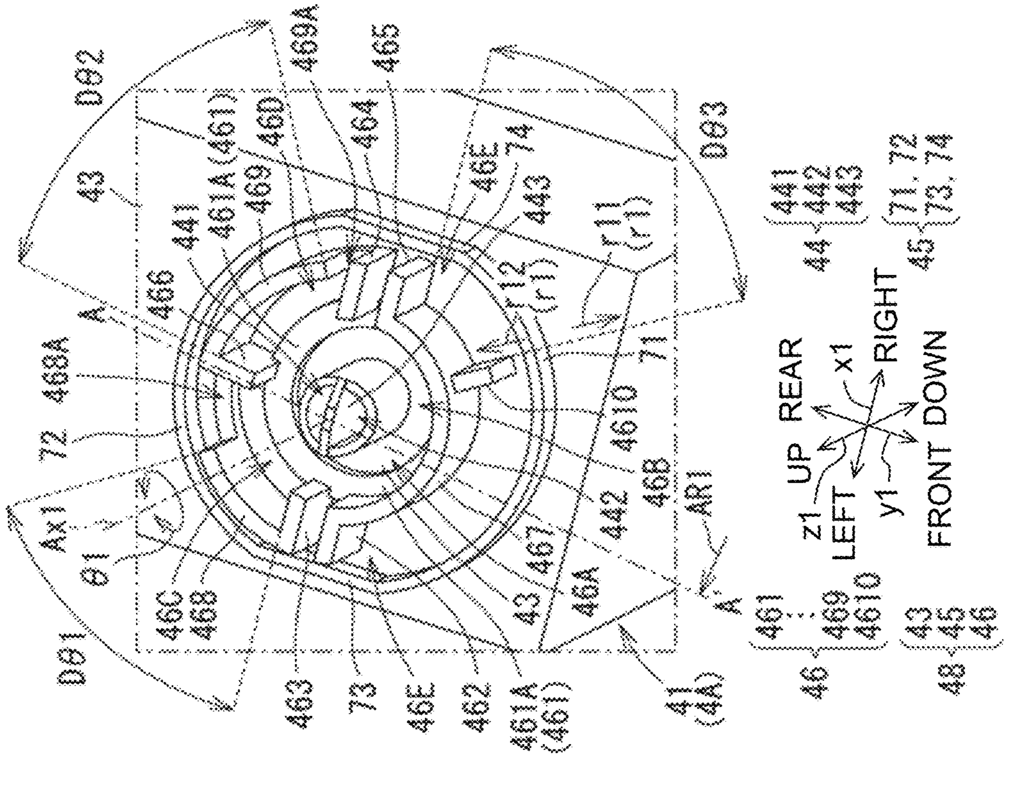
Figure 4B:
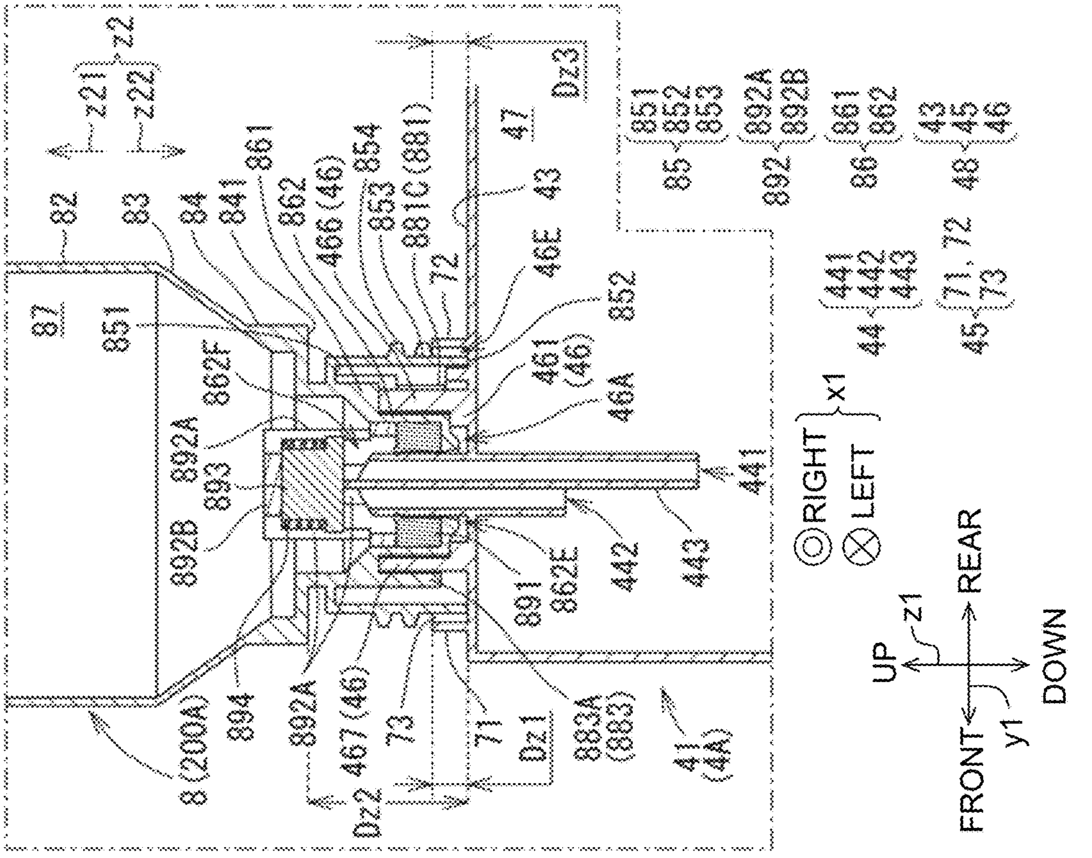

FIG. 4A is a perspective view of a projecting wall 45, a needle 44 and a receiver key member 46 provided on a body 41, and FIG. 4B is a cross-sectional view of a vertical cross section of the body 41, along a one-dot chain line A-A' and as seen from the orientation of an arrow AR1 of FIG. 4A.

Figure 5A:
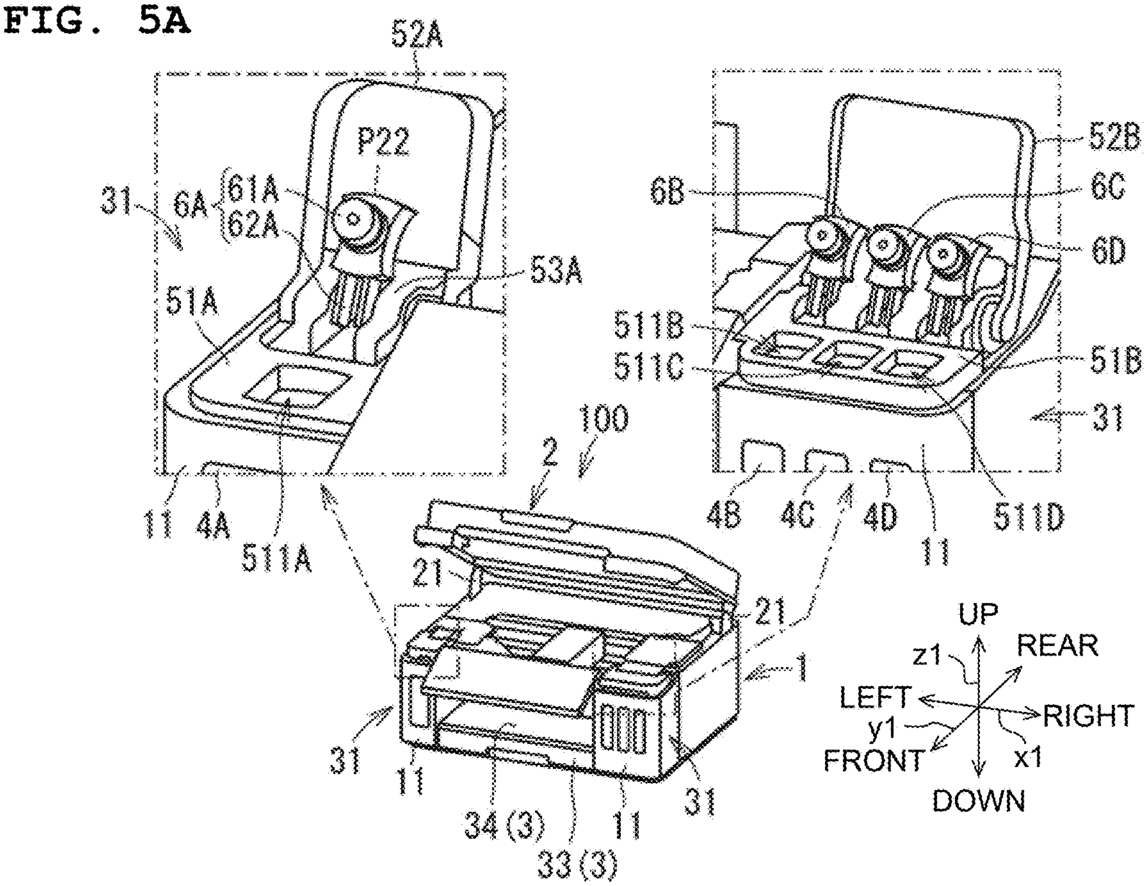
Figure 5B:
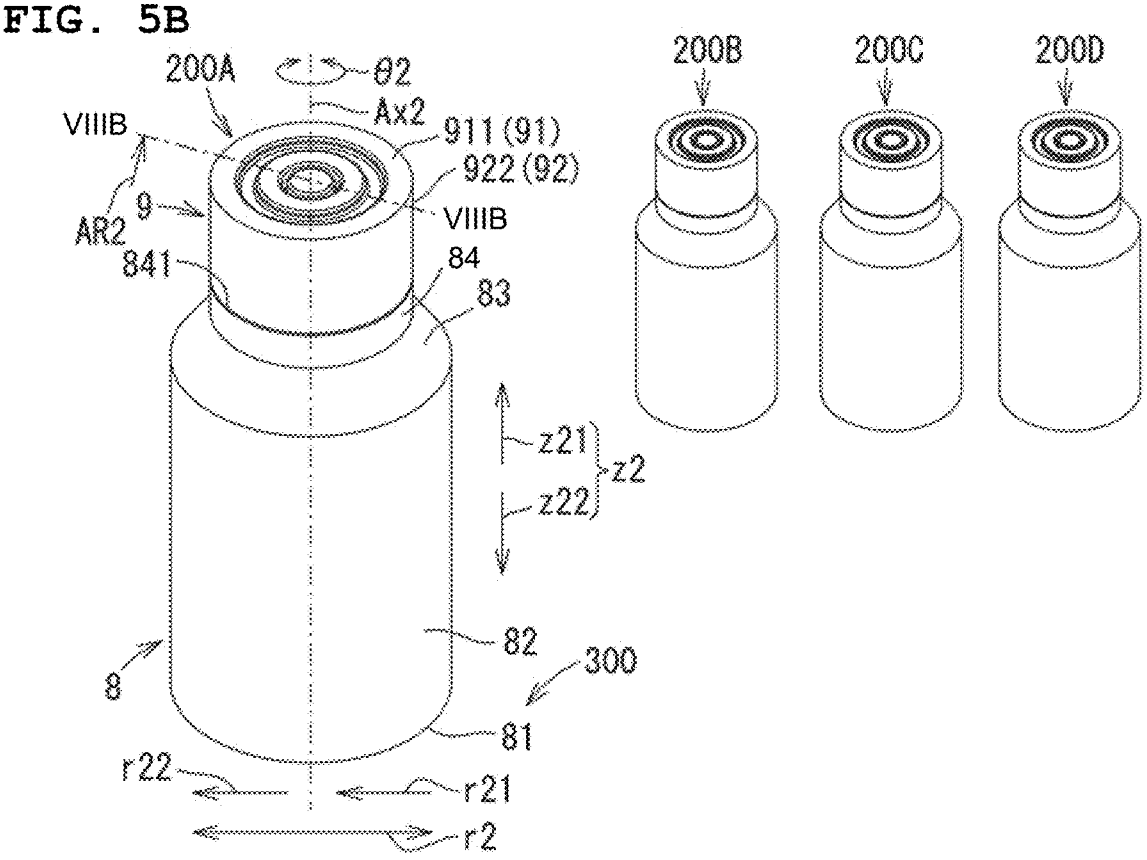

FIG. 5A is a perspective view of the tank set 31 in a case that the caps 6A to 6D are each at an opening position P22, and FIG. 5B is a perspective view of each of liquid containers 200A to 200D.

Figure 6A:
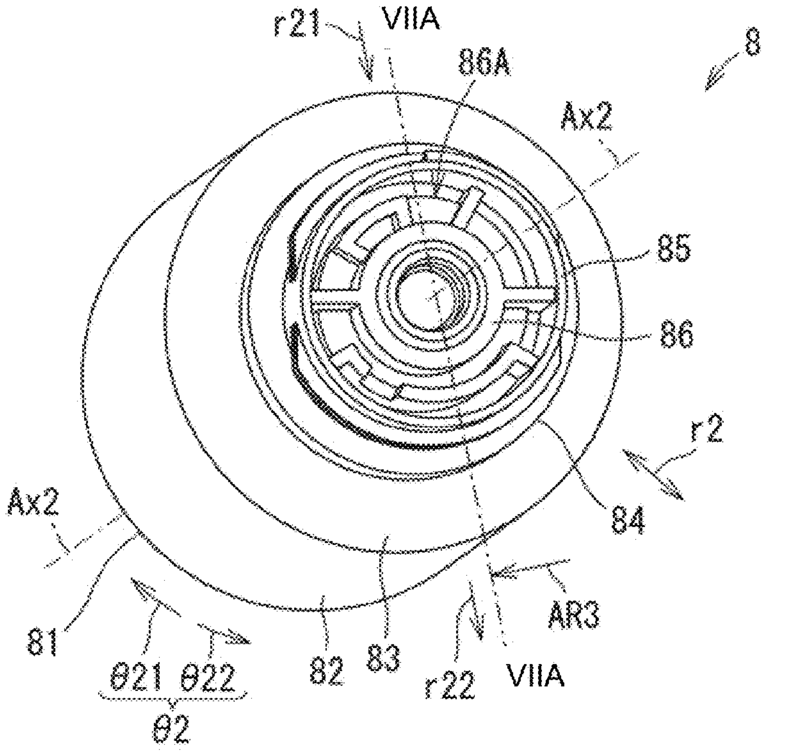
Figure 6B:
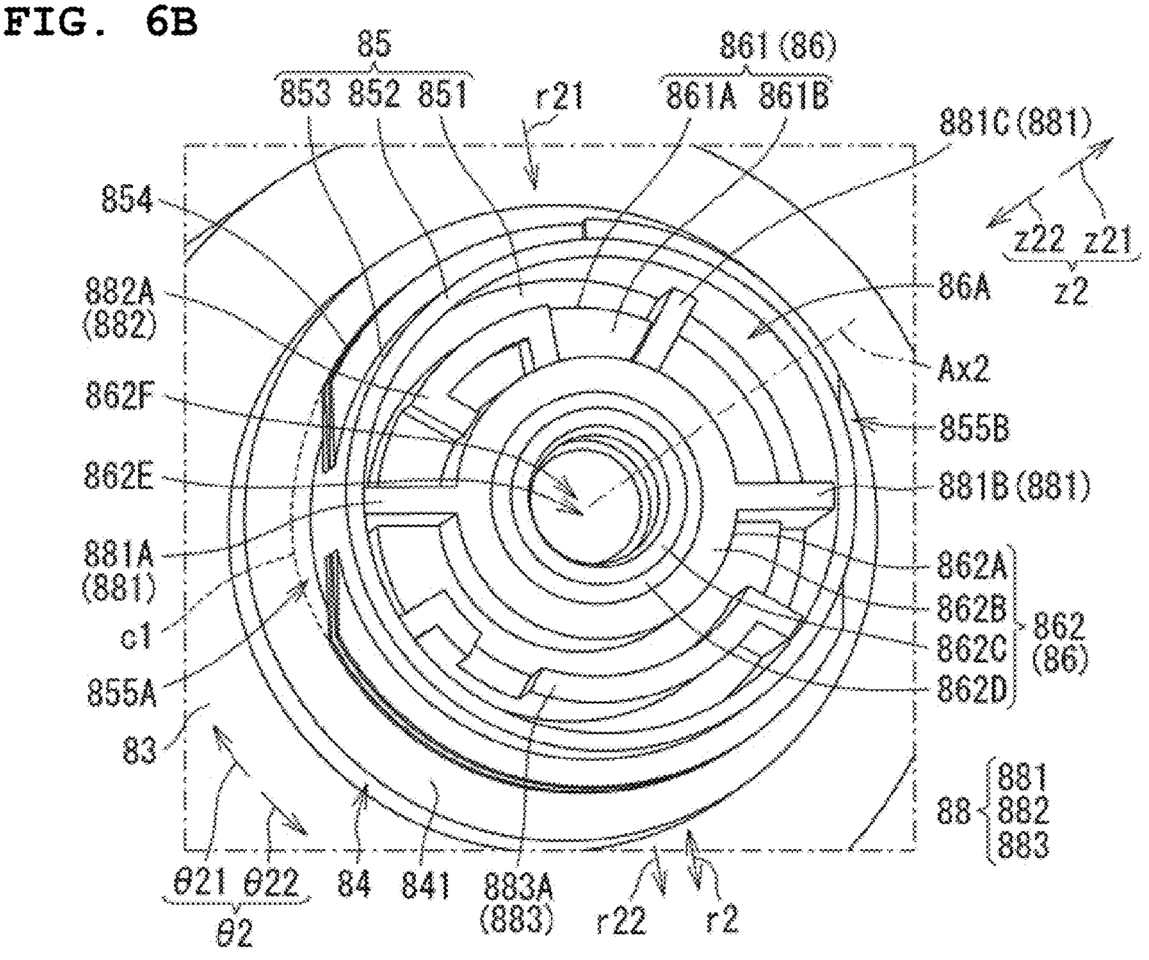

FIG. 6A is a perspective view depicting the outer appearance of a main body 8, and FIG. 6B is an enlarged view of a configuration on a base part 84 of FIG. 6A.

Figure 7B:
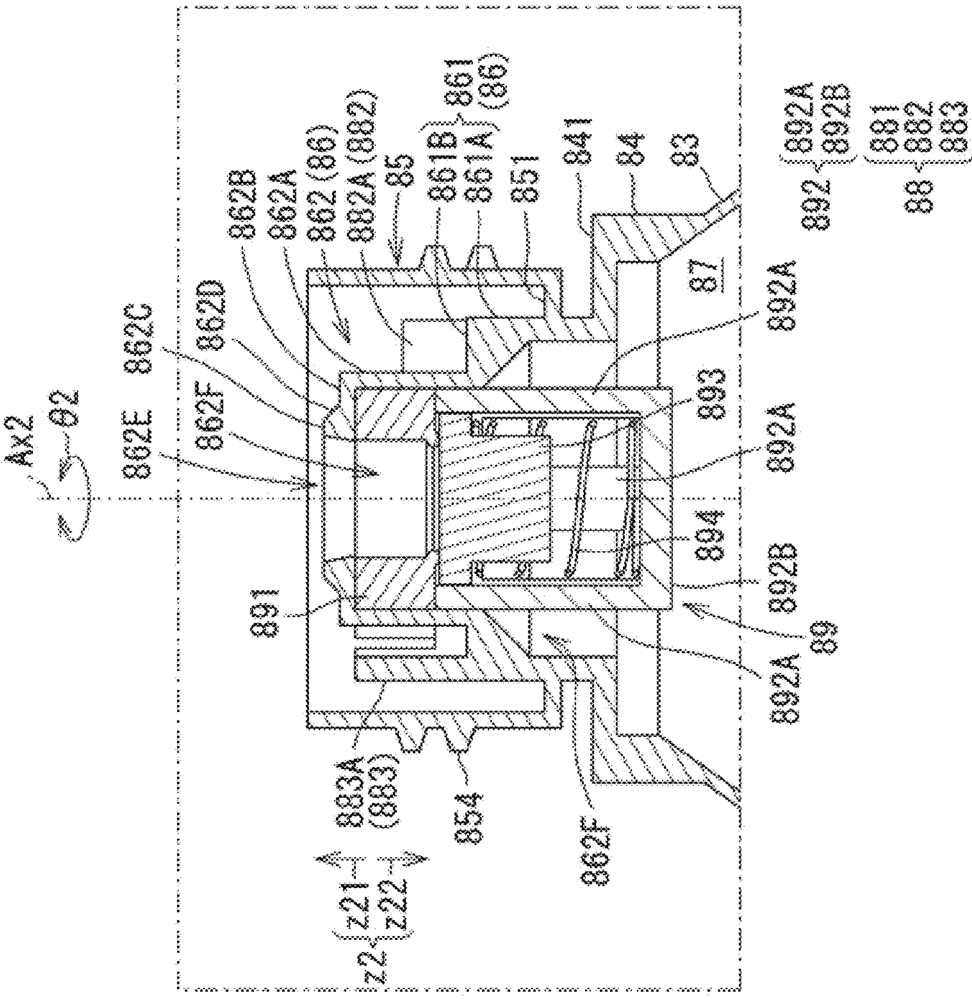
Figure 7A:
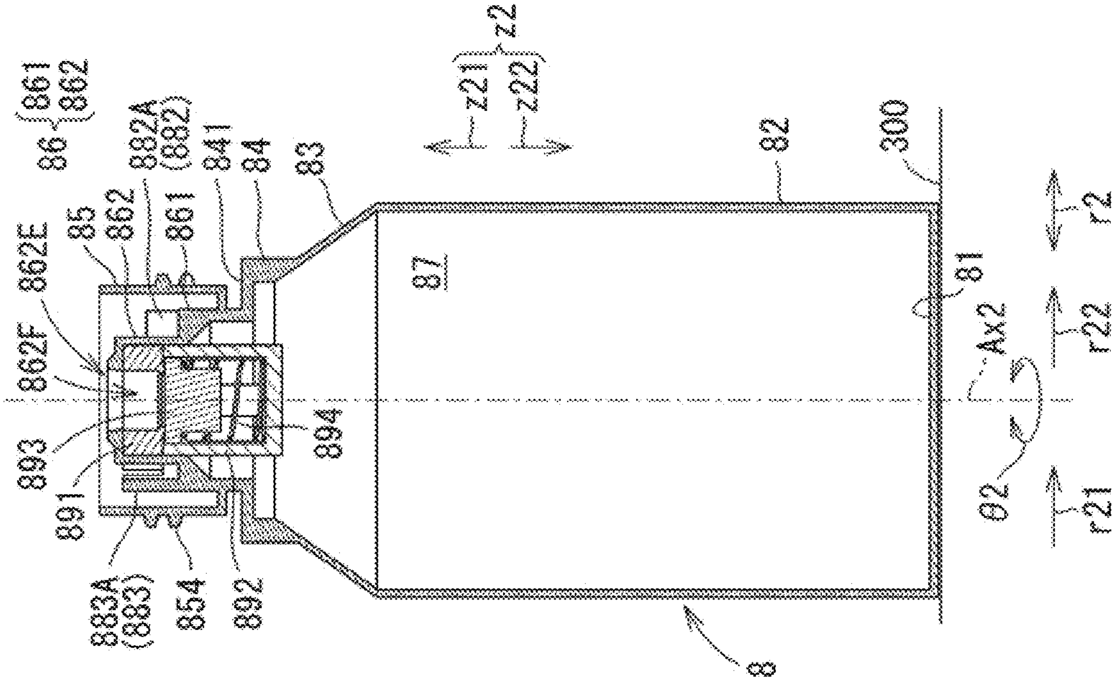

FIG. 7A is a view of a vertical cross-section of the main body 8, along a one-dot chain line VIIA-VIIA and as seen from the orientation of an arrow AR3 of FIG. 6A, and FIG. 7B is an enlarged view of a configuration on the base part 84 of FIG. 7A.

Figure 8A:
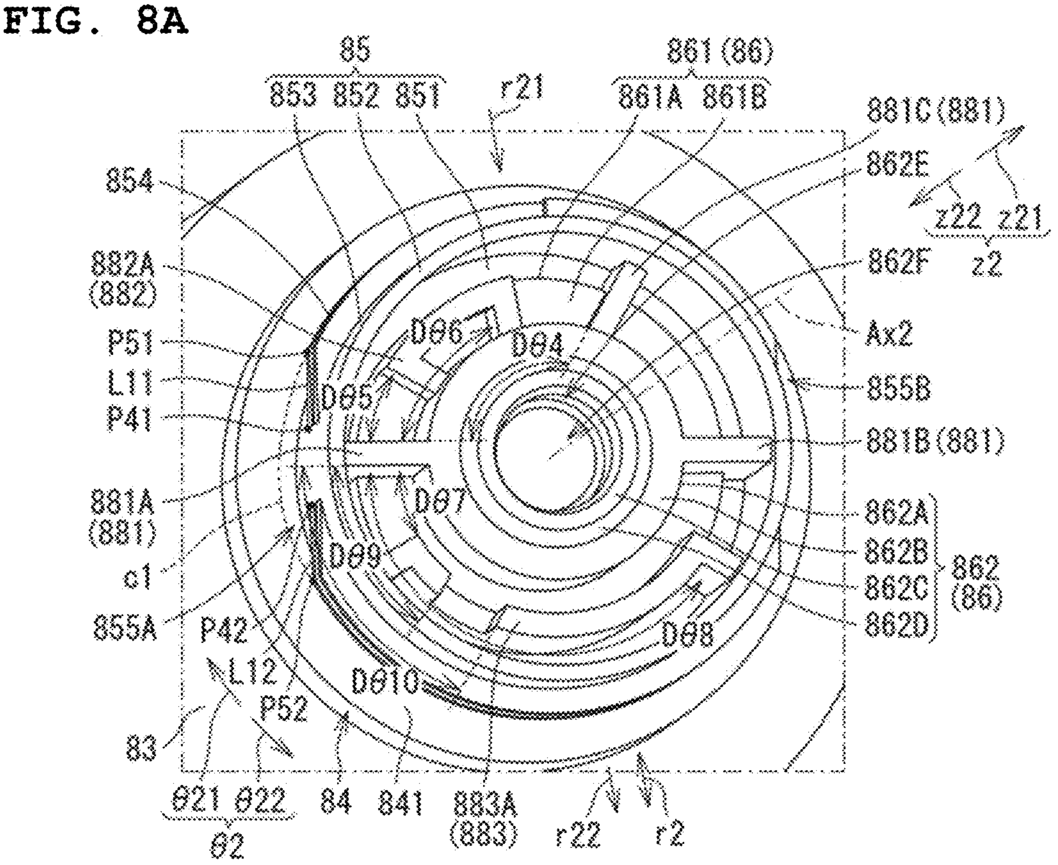
Figure 8B:
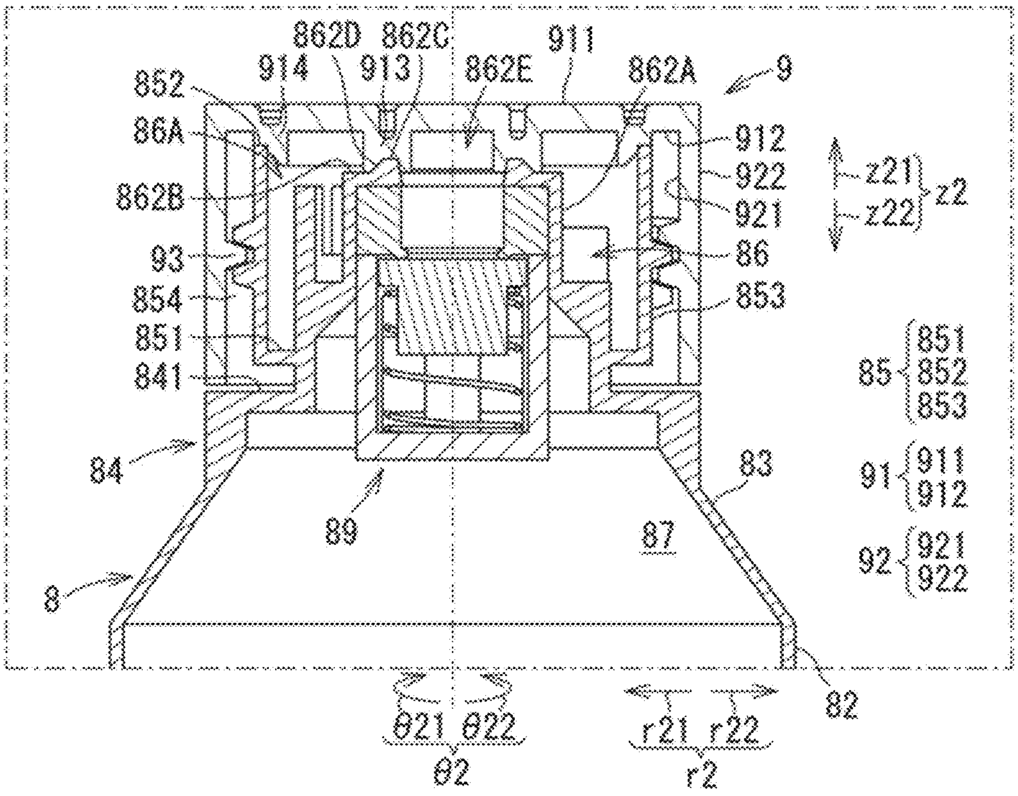

FIG. 8A is a perspective view indicating angles Dθ4 to Dθ10 in the receiver key member 46; and FIG. 8B is a view of a vertical cross section of the container cap 9 and a vertical cross section of a part of the main body 8, along a one-dot chain line VIIIB-VIIIB and as seen from the orientation of an arrow AR2 of FIG. 5B.

Figure 9A:
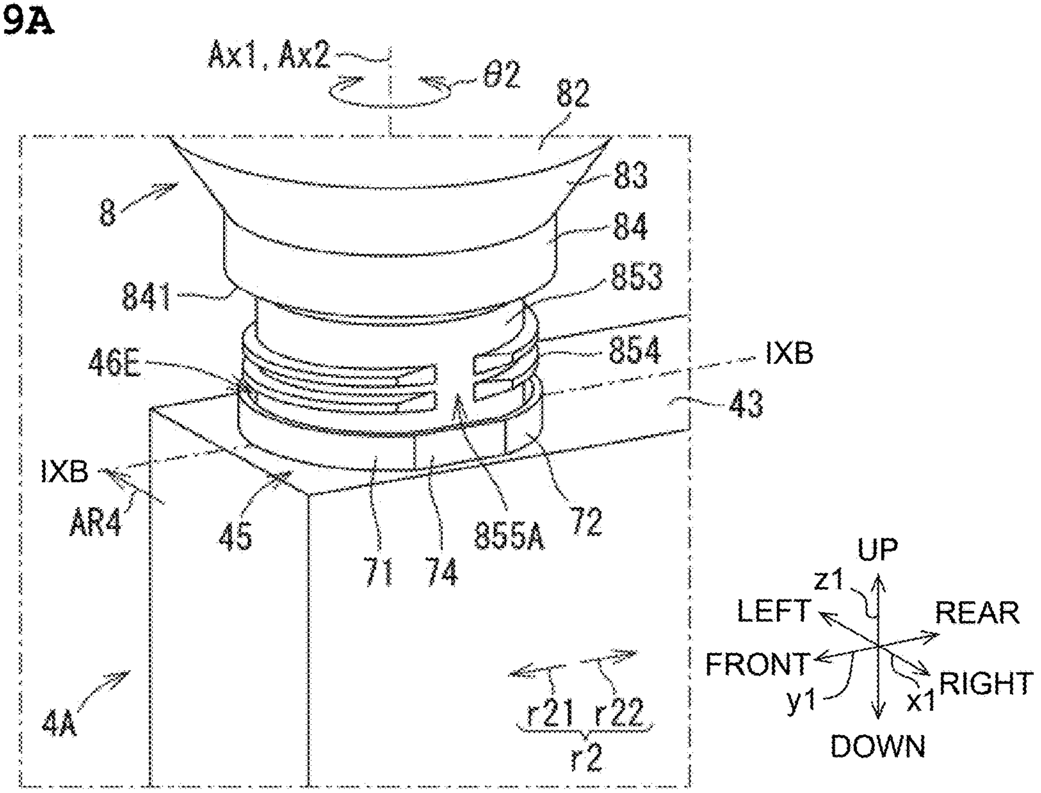
Figure 9B:
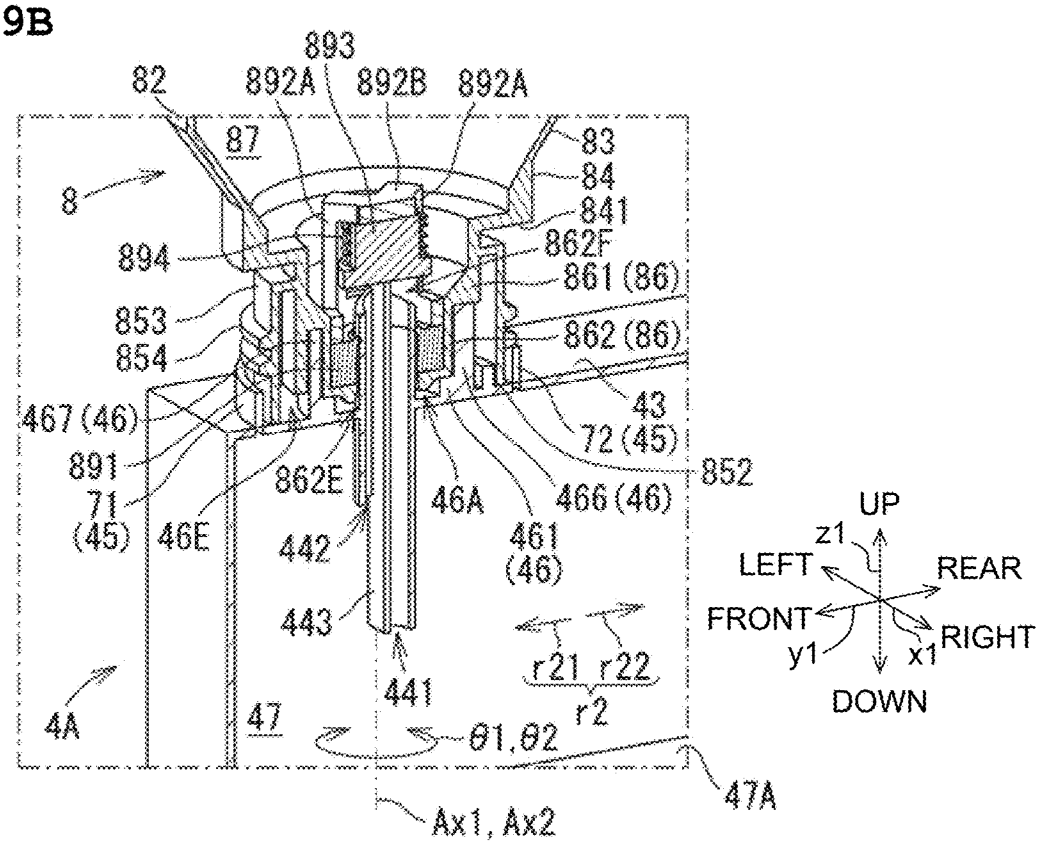

FIG. 9A is a perspective view of a tank 4A to which the main body 8 is connected, and FIG. 9B is a vertical cross-sectional view of the main body 8 and the tank 4A, along a one-dot chain line IXB-IXB and as seen from the orientation of an arrow AR4 of FIG. 9A.

Figure 10A:
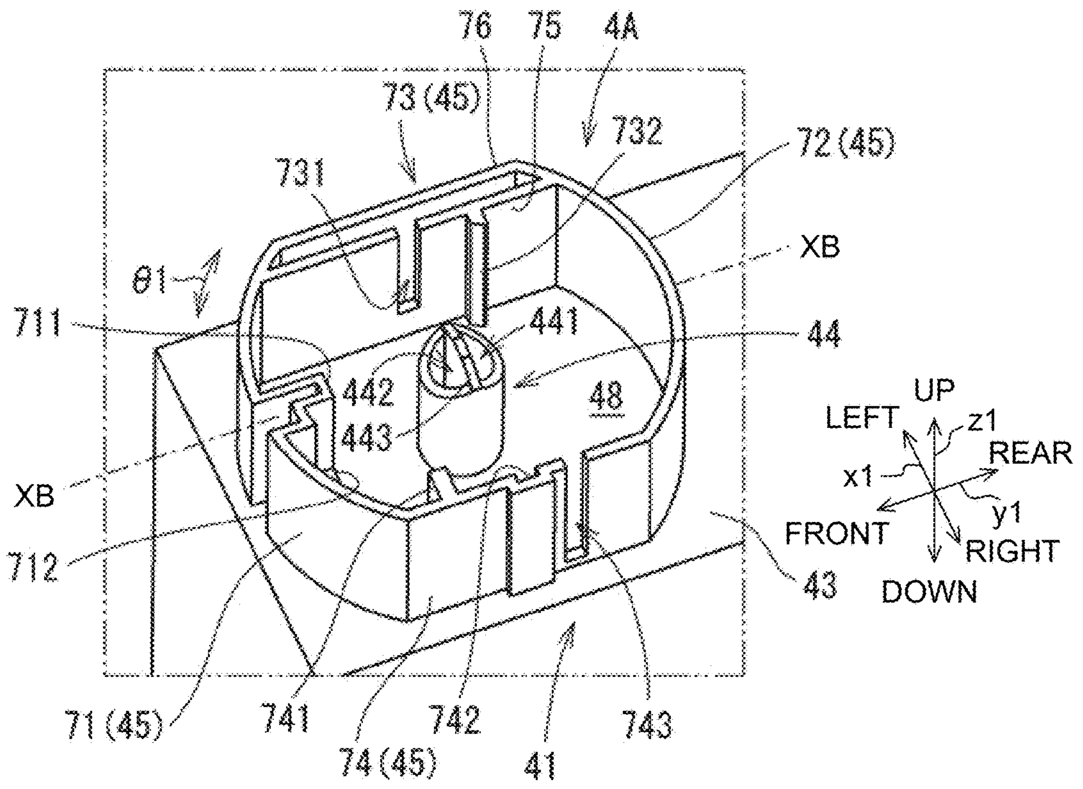
Figure 10B:
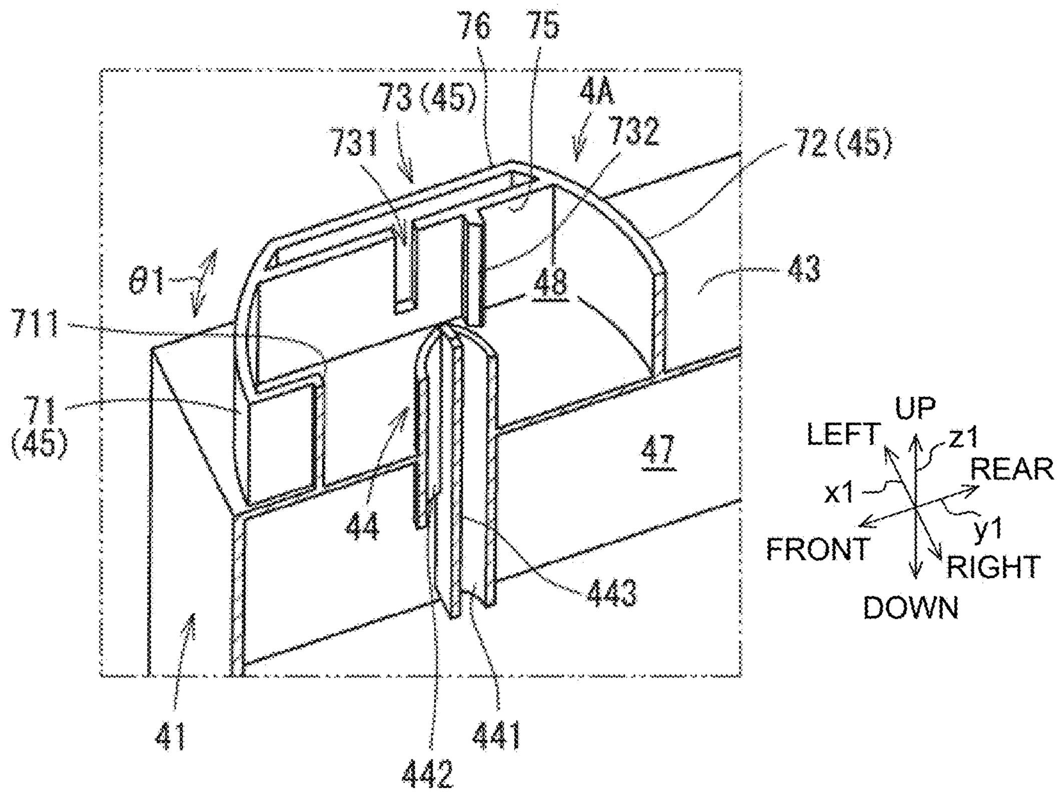

FIG. 10A is a perspective view of a projecting wall 45 and a needle 44 according to a modification, and FIG. 10B is a vertical cross-sectional view of the body 41 as seen from the right side thereof, along a one-dot chain line XB-XB of FIG. 10A.

Figure 11A:
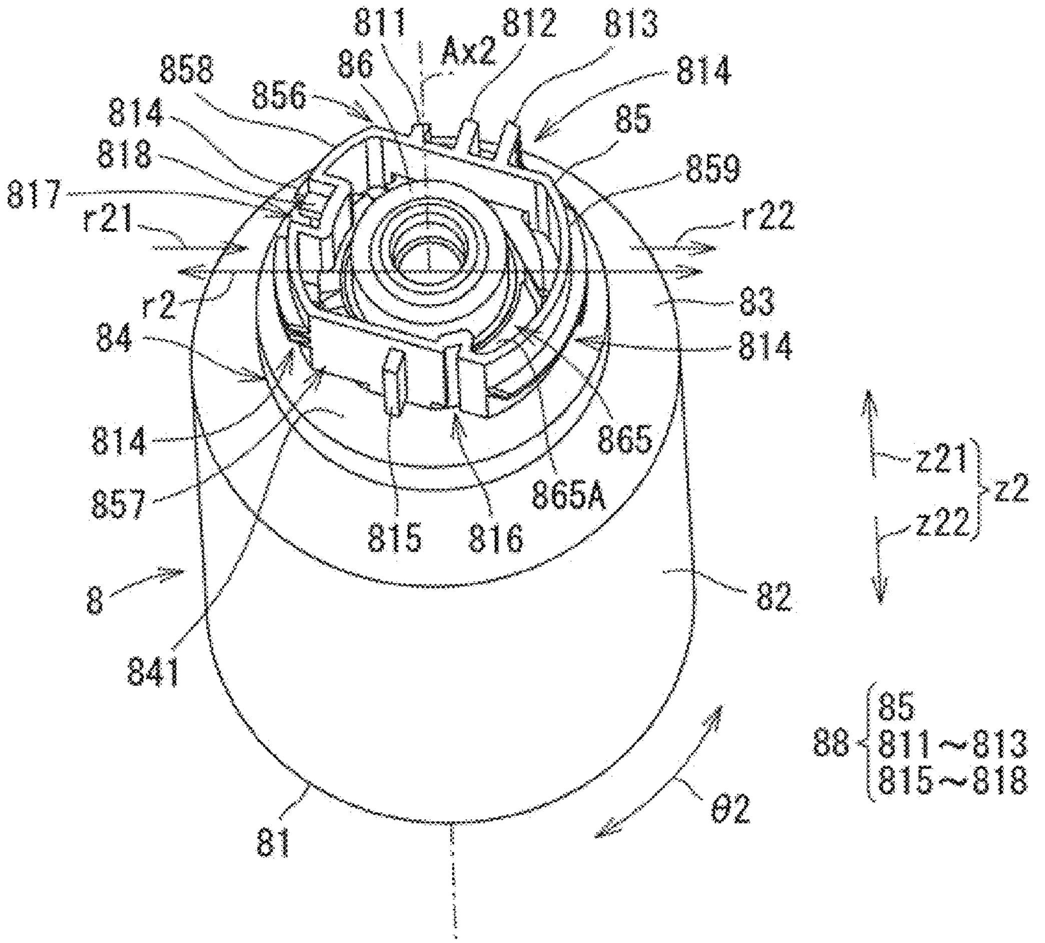
Figure 11B:
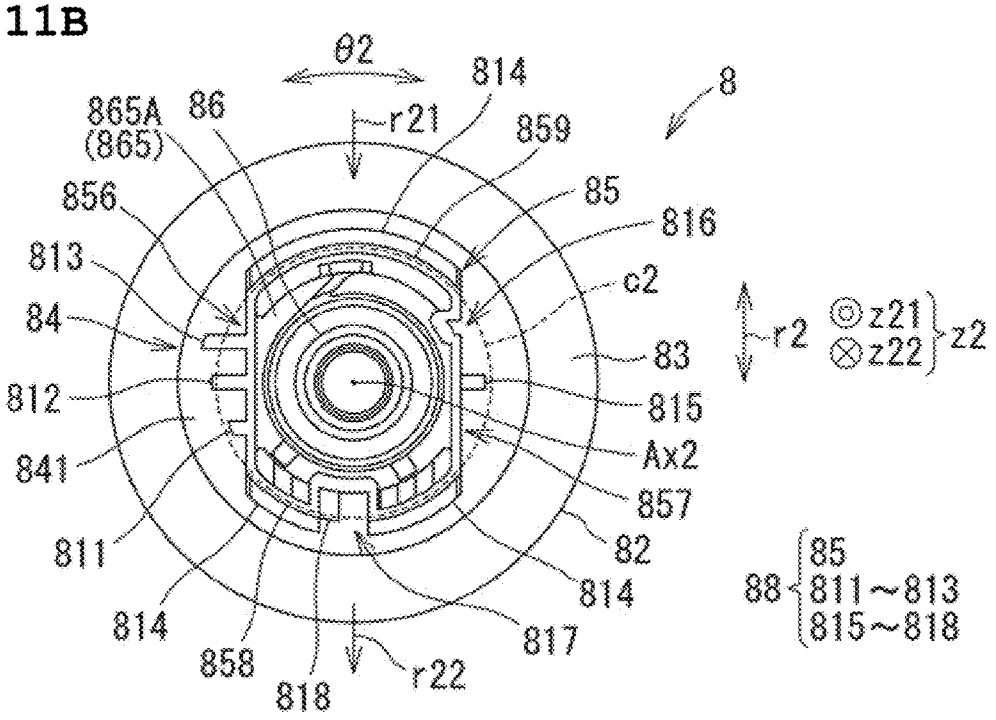

FIG. 11A is a perspective view depicting the outer appearance of a main body 8 according to the modification, and FIG. 11B is a plan view of the main body 8 of FIG. 11A in an approaching orientation z22.

Figure 12:
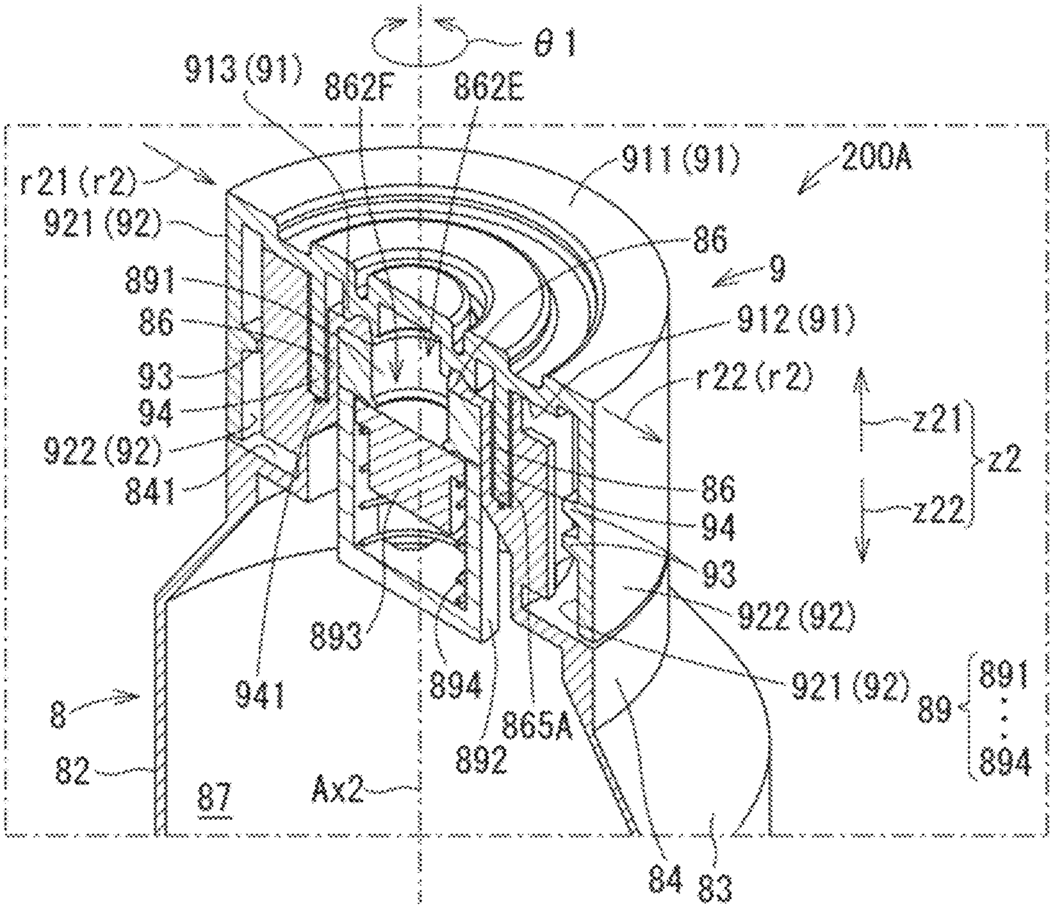

FIG. 12 corresponds to FIG. 8B for depicting a vertical cross-sectional view of the main body 8 and the container cap 9 according to the modification.

In the following, an embodiment of the present disclosure will be described. Note that the embodiment which is to be explained below is merely an example of the present disclosure; it is needless to say that the embodiment can be appropriately changed without changing the gist of the present disclosure. Further, an up-down direction z1 is defined, with a posture in which a MFP 100 is installed usably in a horizontal plane (a posture of FIG. 1, also referred to as a "usage posture"), as the reference; a front-rear direction y1 is defined, with a side on which an opening 1B of the MFP 100 is provided is defined as a front side (front surface); and a left-right direction x1 is defined, with the MFP 100 as seen from the front side (front surface). In the present embodiment, in the usable posture, the up-down direction z1 is the vertical direction, the front-rear direction y1 and the left-right direction x1 are parallel to the horizontal plane, and the front-rear direction y1 and the left-right direction x1 are orthogonal to each other.

<Configuration of MFP 100>

In FIG. 1, the MFP 100 is a multi-functional peripheral, and is provided with a casing 1, a casing cover 2 and a printer part 3. The MFP 100 is an example of a "liquid consuming apparatus" and is a part of a liquid supplying apparatus.

The casing 1 has a substantially rectangular parallelepiped shape and partitions an internal space 1A (see FIG. 1B) of the MFP 100 from the outside. An upper end of the internal space 1A is an opening which is oriented upward. An opening 1B which is oriented frontward is formed in the front surface 11 of the casing 1, at a location in the vicinity to the center in the left-right direction x1. The opening 1B has a rectangular shape as seen in a plan view from the front, and is communicated with the internal space 1A.

The casing cover 2 is coupled or linked to the casing 1, at a location in the vicinity to an upper rear corner of the casing 1, with a coupling tool 21 (see FIG. 1B); the casing cover 2 rotates or pivots between a shielding position P11 (see FIG. 1A) and an exposing position P12 (see FIG. 1B) about the rotation axis of the coupling tool 21. At the shielding position P11, the casing cover 2 shields constituent components (see FIG. 1B) in the internal space 1A. The constituent components include a tank set 31, a recording part 32, etc. At the exposing position P12, the casing cover 2 exposes these constituent components to the outside.

The casing cover 2 may accommodate, in the inside thereof, a scanner part configured to optically read a manuscript (original). Other than this, the MFP 100 may have a facsimile function, etc.

Figure 1B:
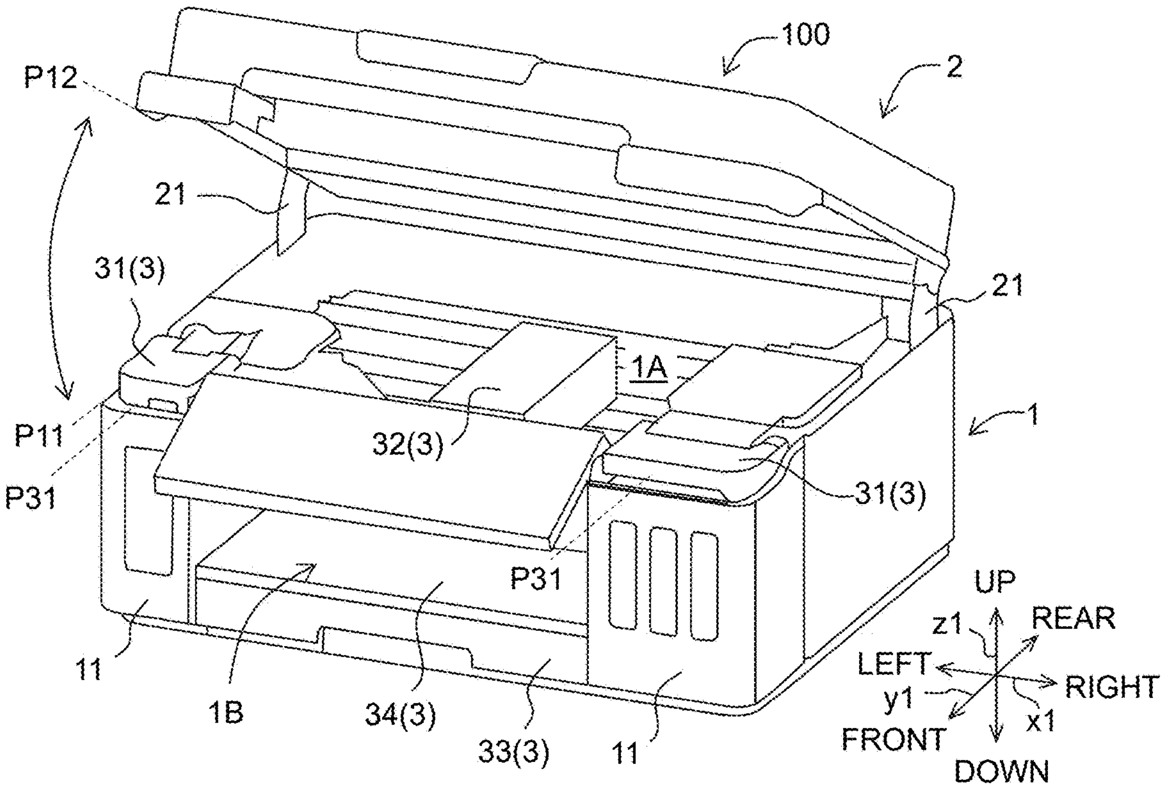
FIG. 1B is a perspective view depicting the outer appearance of the MFP 100 in a case that the casing cover 2 is at an exposing position P12.
Figure 2:
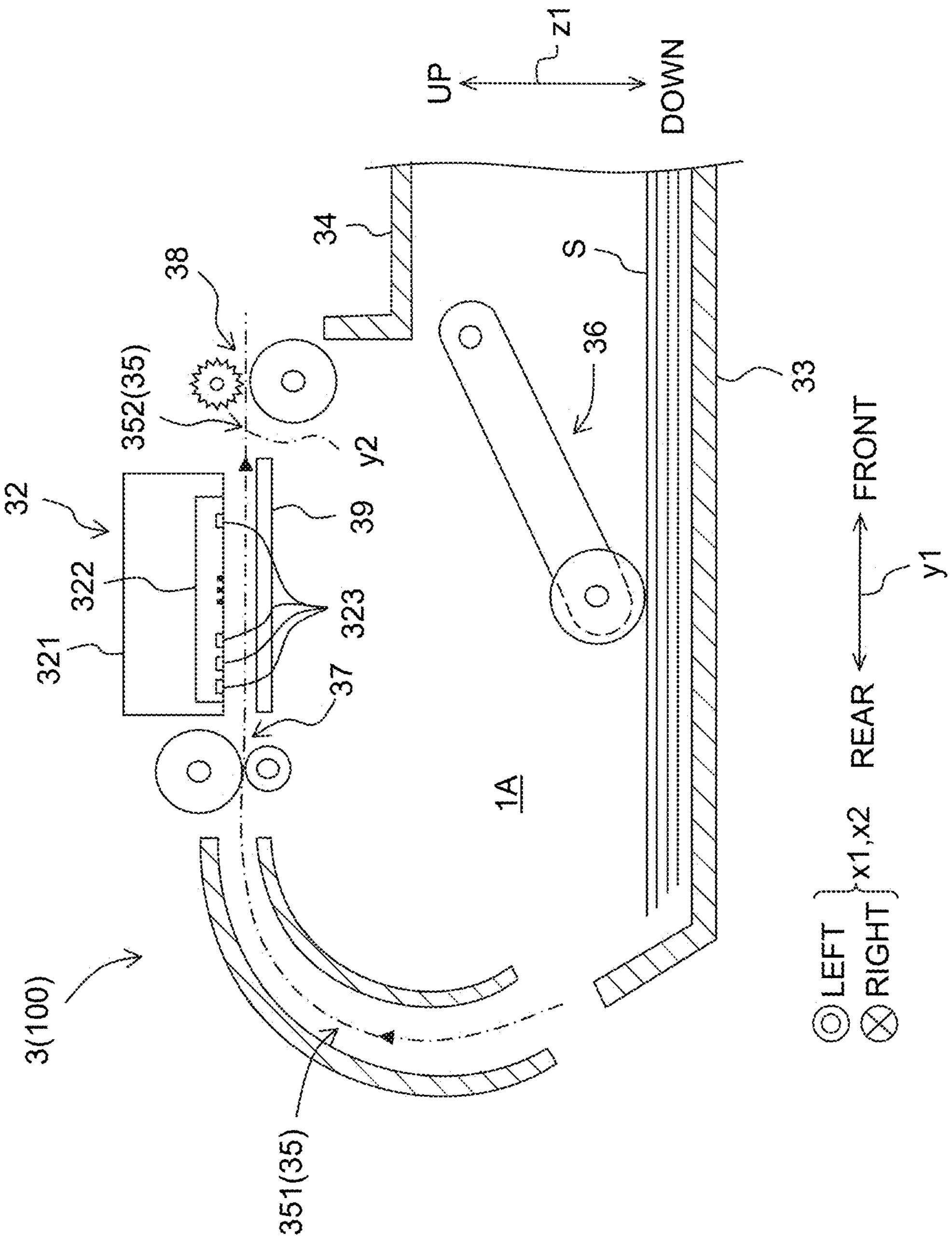
FIG. 2 is a vertical cross-sectional view schematically depicting the internal structure of a printer part 3.

In FIG. 2, other than the tank set 31 and the recording part 32 (see FIG. 1B), the printer part 3 is provided with, in the internal space 1A, a supply tray 33, a discharge tray 34, a conveying route 35, a feeding roller part 36, a conveying roller part 37, a discharging roller part 38 and a platen 39, and records an image on a sheet S (paper sheet S, paper S; see FIG. 2) in the ink-jet recording system.

Figure 1A:
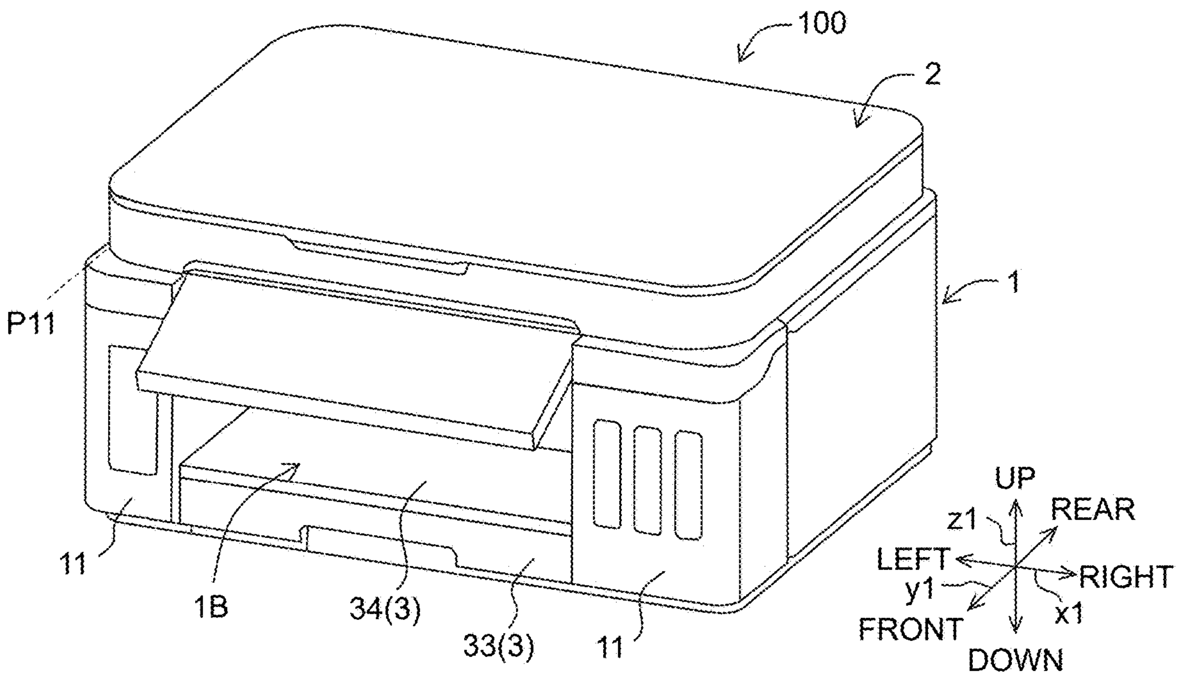
FIG. 1A is a perspective view depicting the outer appearance of a MFP (Multi-Functional Peripheral) 100 in a case that a casing cover 2 is at a shielding position P11.

The supply tray 33 and the discharge tray 34 are installed in the internal space 1A via the opening 1B (see FIGS. 1A and 1*i*). A plurality of pieces of the sheet S are stacked in the supply tray 33. The discharge tray 34 is positioned above the supply tray 33, and supports a sheet S on which an image is recorded. The conveying route 35 is indicated in FIG. 2 by an arrow of a one-dot chain line, and has a curve part 351 and a straight line (linear) part 352. The curved part 351 makes a U-turn frontward while extending upward from a rear end of the supply tray 33. The straight line part 352 extends frontward linearly from a downstream end of the curved part 351 and reaches a rear end of the discharge tray 34.

The feeding roller part 36 feeds, one by one, the sheets S on the supply tray 33 to an upstream end of the curved part 351. The conveying roller part 37 is located at a downstream end of the curved part 351, and feeds the sheet S conveyed by the curved part 351 toward the straight line part 352 in a conveying orientation y2. The conveying orientation y2 is frontward in the straight line part 352. The discharging roller part 38 is located immediately behind (on the rear side) of the discharge tray 34 in the straight line part 352, and discharges the sheet S conveyed in the straight line part 352 to the discharge tray 34.

The platen 39 is positioned, in the straight line part 352, between the conveying roller part 37 and the discharging roller part 38, and supports the sheet S, which is fed out from the conveying roller part 37, from therebelow. The recording part 32 is positioned above the platen 39, and is provided with a carriage 321 and a recording head 322. The carriage 321 moves in a reciprocal manner in a main scanning direction x2 which is parallel to the left-right direction x1. The recording head 322 is mounted on the carriage 321 so that a lower surface of the recording head 322 faces or is opposite to an upper surface of the platen 39, via the straight line part 352. A plurality of nozzles 323 are aligned, in the front-rear direction y1 and the left-right direction x1, in the lower surface of the recording head 322. The recording head 322 discharges or ejects inks of four colors (four color inks) stored inside the recording head 322, from the plurality of nozzles 323. The ink(s) is (are) an example of a "liquid". The four colors are Y color (yellow), M color (magenta), C color (cyan) and K color (black). The recording head 322 discharges the ink(s) from the plurality of nozzles 323 toward the sheet S stopped on the platen 39 while moving together with the carriage 321 in the main scanning direction x2 at a constant speed. With this, an image corresponding to one pass is recorded on the sheet S. In a case that recording of the image corresponding to one pass is ended, the sheet S is conveyed in the conveying orientation y2 by a width corresponding to a unit line feed by an intermittent conveyance by the conveying roller part 37. This image recording and the intermittent conveyance are alternately repeated to thereby record an image on the entirety of the sheet S.

<Tank Set 31>

In FIGS. 3A and 3B, the tank set 31 is provided with four tanks 4A to 4D, two holding members 51A and 51B, four caps 6A to 6D, and two tank covers 52A and 52B. In FIG. 3B, the holding members 51A and 51B, the caps 6A to 6D and the tank covers 52A and 52B are not illustrated.

The tanks 4A to 4D are installed at a location immediately behind the front surface 11. The tank 4A is positioned on the left side with respect to the supply tray 33. The tanks 4B to 4D are positioned on the right side with respect to the supply tray 33, and are arranged side by side from the left to the right, in an order of the tank 4B, the tank 4C and the tank 4D.

<Tank 4A>

The tank 4A is an example of a "tank", and is provided with a body 41. The body 41 has a substantially rectangular parallelepiped shape of which size in the left-right direction x1 is smaller than a size thereof in the up-down direction z1 and a size thereof in the front-rear direction y1. The body 41 partitions a storing chamber 47 (see FIG. 4B) configured to store the ink of the K color from the outside. The body 41 is formed of an injection molding of a resin material having a light-translucency, etc., except for a side surface, of the body 41, on one side in the left-right direction x1 thereof. The side surface on the one side in the left-right direction x1 is closed or sealed by a resin film which is thinner than other parts different from the side surface on the one side in the left-right direction x1.

As depicted in FIG. 3B, one end of one of tubes 42 made of a flexible resin is connected to a location, of the body 41, in the vicinity of the rear end of the body 41. The other end of one of the respective tubes 42 is connected to the recording head 322. In accordance with consumption of the ink inside the recording head 322, the ink inside the body 41 is supplied to the recording head 322 via one of the tubes 42. An atmosphere communicating hole is also formed at a location, of the body 41, in the vicinity of the rear end of the body 41.

In FIG. 4A, the body 41 has an upper surface 43 which is parallel to a horizontal plane. A needle 44 (an example of a "communicating tube"), a projecting wall 45 and a receiver key member 46 are integrally provided on the upper surface 43.

The needle 44 is a member which has a shape of a circular pipe and which is elongated in the up-down direction z1. An outer circumferential surface and an inner circumferential surface of the needle 44 share an axis Ax1 which is parallel to the up-down direction z1. The needle 44 extends upward perpendicularly from the upper surface 43, and extends also downward perpendicularly with respect to the upper surface 43 and toward the inside of the storing chamber 47. An upper end of the needle 44 is located above the receiver key member 46. A lower end of the needle 44 is located above a bottom surface 47A of the storing chamber 47, as depicted in FIG. 9B. In FIGS. 4A and 4B, the needle 44 has two channels 441 and 442, and a partition wall 443. The two channels 441 and 442 extend downward linearly from a location, in the needle 44, which is lower to some extent from the upper end of the needle 44, toward the storing chamber 47 of the body 41. An upper end of each of the channels 441 and 442 is released upward, and a lower end of each of the channels 441 and 442 is released downward. The channels 441 and 442 are partitioned with respect to each other by the partition wall 443 which expands in the up-down direction z1 and the left-right direction x1 in an entire area between the upper end and the lower end of the needle 44. The partition wall 443 extends up to a location above the channels 441 and 442. The channel 441 extends up to a location below the channel 442. An opening in the upper end of the channel 441 is an example of an "inlet port". The channels 441 and 442 are examples of a "first channel" and a "second channel", respectively.

In FIG. 4A, the projecting wall 45 has curved plates 71 and 72 and connecting plates 73 and 74 so as to define an area which is elliptic in a plan view thereabove (hereinafter referred also to as a "first plan view") in the upper surface 43. The projecting wall 45 projects from the upper surface 43 upward only by a distance Dz1 (see FIG. 4B). The distance Dz1 is an example of a "second distance". A projecting end surface (namely, an upper end surface) of the projecting wall 45 is parallel to the upper surface 43.

The curved plates 71 and 72 face each other and are apart from each other in the front-rear direction y1 with the needle 44 being interposed therebetween. Each of the curved plates 71 and 72 is substantially semi-cylindrically shaped in the first plan view. Inner circumferential surfaces of the curved plates 71 and 72 are each circular-arc shaped, while being rotationally moved approximately 180 degrees from each other about the axis Ax1. The curved plate 71 is positioned in front of the curved plate 72 and swells or protrudes frontward.

The connecting plates 73 and 74 face each other and are apart from each other in the left-right direction x1 with the needle 44 being interposed therebetween. A right side surface of the connecting plate 73 and a left side surface of the connecting plate 74 face each other and are apart from each other in the left-right direction x1 with the needle 44 being interposed therebetween, and are symmetrically shaped to each other, with a virtual plane including the axis Ax1 and parallel to the up-down direction z1 and the front-rear direction y1 as the reference. Each of the right side surface of the connecting plate 73 and the left side surface of the connecting plate 74 is substantially rectangular-shaped which is elongated in the front-rear direction y1. A distance in the left-right direction x1 between the connecting plates 73 and 74 is not less than the diameter of an outer circumferential surface 853 (see FIG. 6B) of a circular wall 85 (which will be described later on), as appreciated also from FIG. 9A. The connecting plate 73 connects or links left ends, respectively, of the curved plates 71 and 72 to each other, and the connecting plate 74 connects or links right ends, respectively, of the curved plates 71 and 72 to each other.

The receiver key member 46 projects upward in the upper surface 43, perpendicularly between the needle 44 and the projecting wall 45. The receiver key member 46 partitions or defines a key hole 48 (an example of a "tank recessed part") which is released upward, together with the upper surface 43 and the projecting wall 45. Although the key hole 48 is in conformity to a key member 88 (see FIG. 6B) formed in the liquid container 200A, the key hole 48 is not in conformity to a key member of each of the liquid containers 200B to 200D different from the liquid container 200A. The receiver key member 46 includes a base part 461 and ribs 462 to 4610.

The base part 461 is substantially cylindrical shape or substantially ringed shape in the first plan view (see FIG. 4A), and projects from the upper surface 43 perpendicularly up to a location below the distance Dz1 (see FIG. 4B). The diameter of the inner circumferential surface of the base part 461 is not less than the inner diameter of a circular flat surface 862B (see FIG. 6B) and less than the outer diameter of the circular flat surface 862B. The diameter of the outer circumferential surface of the base part 461 is substantially same as the outer diameter of the circular flat surface 862B. The upper surface of the base part 461 is parallel to the upper surface 43 and is oriented upward, and serves as a contact surface 461A with which the circular flat surface 862B is brought into contact at the time of ink replenishment.

Each of the ribs 462 and 463 extends linearly in the left-right direction x2 between the needle 44 and the connecting plate 73. In each of the ribs 462 and 463, a part near to a right end thereof projects upward perpendicularly from the contact surface 461A, and another part different from the part near to right end projects upward perpendicularly from the upper surface 43. Each of the ribs 462 and 463 are apart from the needle 44 leftward, and are apart from the connecting plate 73 rightward. The ribs 462 and 463 are symmetrically shaped to each other, with a virtual plane including the axis Ax1 and parallel to the up-down direction z1 and the left-right direction x1 as the reference; and the ribs 462 and 463 are positioned with a gap which is substantially constant in the front-rear direction y1 therebetween.

The ribs 464 and 465 have shapes, respectively, which are obtained by rotationally moving the ribs 462 and 463, respectively, about the axis Ax1 by approximately 180 degrees only.

A rib 466 extends linearly in the front-rear direction y1 between the needle 44 and the curved plate 72. In the rib 466, a part near to a front end thereof projects upward perpendicularly from the contact surface 461A, and another part different from the part near to the front end projects upward perpendicularly from the upper surface 43. The rib 466 is apart from the needle 44 rearward, and is apart from the curved plate 72 frontward. The rib 466 is positioned at a location which is intermediate between the ribs 463 and 464 in a circumferential direction θ1 of the axis Ax1. The width in the left-right direction x1 of the rib 466 is substantially constant over an entire area thereof in the front-rear direction y1.

A rib 467 is substantially semi-cylindrical shaped in the first plan view, and projects upward perpendicularly from the upper surface 43. The rib 467 is positioned at a substantially intermediate location between the needle 44 and the curved surface 71 in a radial direction r1 of the axis Ax1. The rib 467 extends substantially parallel to the curved plate 71 along the outer circumferential surface of the base part 461, within a range between both inner ends, respectively, of the ribs 462 and 465, in the circumferential direction θ1. The term "inner end" is an end in an orientation r12 approaching toward the axis Ax1 in the radial direction r1 (hereinafter referred also to as an "inward orientation" r12).

Upper end surfaces, respectively, of the ribs 462 and 467 are flush with one another, and are located above the projecting wall 45. The term "flush" means that there is no difference in height, and is parallel.

Each of ribs 468 and 469 has a substantially quarter-cylindrical shape which is coaxial with the axis Ax1 in the first plan view, and projects upward perpendicularly from the upper surface 43. An upper end surface of each of the ribs 468 and 469 is parallel with respect to the horizontal plane over an entire area thereof in the circumferential direction θ1. The ribs 468 and 469 are positioned, in the radial direction r1, at a substantially intermediate location between the curved plate 72 and the base part 461. The rib 468 extends substantially parallel to the base part 461 and the curved plate 72 in the circumferential direction θ1 at a location between both outer ends, respectively, of the ribs 463 and 466. The rib 469 extends substantially parallel to the base part 461 and the curved plate 72 in the circumferential direction θ1 at a location between both outer ends, respectively, of the ribs 466 and 464. The term "outer end" is an end in an orientation r11 which is opposite to the inward orientation r12 (hereinafter referred also to as an "outward orientation" r11). In FIG. 4A, an example of each of the radial direction r1, the outward orientation r11 and the inward orientation r12.

The upper end surface of the rib 468 is flush with the upper end surface of the rib 463 within a range of an angle Dθ1 from the rib 463 in the circumferential direction θ1. The upper end of the rib 468 is positioned at a location which is lower than the upper end surface of the rib 463 and is positioned above the contact surface 461A in the up-down direction z1 outside the range of the angle Dθ1. Namely, a cutout 468A is formed in the rib 468 outside the range of the angle Dθ1.

The upper end surface of the rib 469 is flush with the upper end surface of the rib 466 within a range of an angle Dθ2 from the rib 466 in the circumferential direction θ1. The upper end surface of the rib 469 is positioned at a location which is lower than the upper end surface of the rib 466 and is positioned above the contact surface 461A in the up-down direction z1 outside the range of the angle Dθ2. Namely, a cutout 469A is formed in the rib 469 outside the range of the angle Dθ2.

The rib 4610 projects outward in the outward orientation r11 on the outer circumferential surface of the rib 467, from a position which is apart from the rib 465 only by an angle Dθ3 in the circumferential direction θ1. A projecting end of the rib 4610 is apart from the curved plate 71 in the inward orientation r12. The rib 4610 extends perpendicularly from the upper surface 43 up to a position below the upper end surface of the rib 467.

Although the rib 4610 projects outward in the outward orientation r11 on the outer circumferential surface of the rib 467, from the position which is apart from the rib 465 only by the angle Dθ3 in the circumferential direction θ1, the rib 4610 is inclined with respect to the front-rear direction y1. An outer end of the rib 4610 is apart from the curved plate 71 in the inward orientation r12. An upper end surface of the rib 4610 is parallel to the upper end surface of the rib 467, at a location below the upper end surface of the rib 467. The width in the circumferential direction θ1 of the rib 4610 is substantially constant over the entire area thereof in the radial direction r1.

Inner ends, respectively, of the ribs 462 to 466 and an inner circumferential surface of the rib 467 define, together with the outer circumferential surface of the needle 44 and the contact surface 461A, the outer shape of a cylindrical space 46A which is opened upward. At a time of ink replenishment, a small diameter part 862 having a cylindrical shape (see FIG. 6B) is inserted to the cylindrical space 46A.

The upper surface 43, the outer circumferential surface of the needle 44, and the inner circumferential surface of the base part 461 define a circular space 46B. The circular space 46B is circular in the first plan view, and is recessed downward with respect to the contact surface 461A in the surrounding of the needle 44. A circular flat surface 862C and a circular inclined surface 862D in the small diameter part 862 (see FIG. 6B) enter into the circular space 46B, at a time of ink replenishment.

Facing surfaces, respectively, of the ribs 463 and 466 in the circumferential direction θ1, the inner circumferential surface of the rib 468, the outer circumferential surface of the base part 461 and the upper surface 43 define a partially circular space 46C. Facing surfaces, respectively, of the ribs 466 and 464 in the circumferential direction θ1, the inner circumferential surface of the rib 469, the outer circumferential surface of the base part 461 and the upper surface 43 define a partially circular space 46D. Each of the partially circular spaces 46C and 46D has a substantially quarter-circular shape in the first plan view, and is recessed downward from the contact surface 461A.

The upper surface 43, the inner circumferential surface of the projecting wall 45 and the ribs 462 to 4610 define an external space 46E. Apart in the vicinity of the forward end part of the circular wall 85 (see FIGS. 6A and 6B) is positioned in the external space 46E at the time of ink replenishment. The external space 46E communicates with the circular space 46A via a gap between the ribs 462 and 463 and a gap between the ribs 464 and 465.

<Tanks 4B to 4D>

In FIGS. 3A and 3B, each of the tanks 4B to 4D is another example of the "tank", and is provided with a body which is configured similarly to the body 41, except for the following points. In the body of each of the tanks 4B to 4D, a receiver key member having a function similar to that of the receiver key member 46 is formed. The receiver key member of each of the tanks 4B to 4D defines a key hole opened upward by a combination of a plurality of ribs, together with an upper surface and a projecting wall. The respective receiver key members of the tanks 4B to 4D have three-dimensional shapes which are mutually different among the tanks 4B to 4D, and which are also different from that of the receiver key member 46 of the tank 4A. The three-dimensional shape of each of the receiver key members is determined by the sizes and/or positions in the left-right direction x1, the front-rear direction y1 and the up-down direction z1 of the respective ribs, or by the number (quantity) of the ribs. The bodies of the respective tanks 4B, 4C and 4D are different from the body 41 in view of a point of storing the inks of C color, M color and Y color, respectively. The bodies of the respective tanks 4B to 4D may also be different from the body 41 in view of the volume of the ink.

<Holding Members 51A, 51B>

In FIG. 3A, the holding member 51A covers the upper surface 43 (see FIG. 4A) of the body 41. The holding member 51A is formed with a through hole 511 (see FIG. 5A) through which the projecting wall 45 and the needle 44 (see FIG. 4A) are inserted. The holding member 51B collectively covers the upper surfaces of the tanks 4B to 4D (see FIG. 3B). The holding member 51B is formed with through holes 511B to 511D (see FIG. 5A). Cylindrical walls and needles possessed by the tanks 4B to 4D are inserted through the through holes 511B and 511D, respectively.

A bearing 53A is provided on the holder member 51A, at a location behind the through hole 511A. Bearings 53B to 53D are provided on the holder member 51B, each at a location behind one of the through holes 511B to 511D. Each of the bearings 53A to 53D has the rotation axis which is parallel to the left-right direction x1, and supports one of the caps 6A to 6D between a closing position P21 (see FIG. 3A) and an opening position P22 (see FIG. 5A), rotatably about the rotation axis of one of the bearings 53A to 53D.

<Caps 6A to 6D>

In FIGS. 3A and 3B and FIGS. 5A and 5B, the cap 6A has a rubber part 61A and an arm part 62A. The rubber part 61A has a cylindrical shape of which diameter is greater than that of the needle 44 (see FIGS. 4A and 4B), and has a hole through which the needle 44 is inserted. Note that FIG. 5A does not illustrate the needle 44, for the sake of convenience. The arm part 62A is formed of a resin material which is harder than that forming the rubber part 61A, and has an elongated stick or bar-like shape. The rubber part 61A is attached to one end of the arm part 62A. The other end of the arm part 62A is provided with a rotation shaft through which the bearing 53A is inserted.

As depicted in FIG. 3A, in a case that the cap 6A is at the closing position P21, the arm part 62A extends frontward from the bearing 53A, and the rubber part 61A fits (is inserted) into the key hole 48 via the through hole 511A of the holding member 51A. In this situation, the needle 44 is inserted into the hole of the rubber part 61A. Note that for the sake of convenience, FIG. 5A does not illustrate the needle 44 and the key hole 48. With this, any leaking and/or drying of the ink inside the body 41 is/are prevented. The opening position P22 is a position which is rotated, from the closing position P21, at an angle approximately in a range of 90 degrees to 100 degrees about the rotation axis of the bearing 53A.

Although the caps 6B to 6D have a similar configuration to that of the cap 6A, the caps 6B to 6D are different from the cap 6A in view of that each of the caps 6B to 6D loosely fits to the key hole provided on one of the liquid containers 200B to 200D (see FIG. 3B, etc.) via one of through holes 511B to 511D of the holding member 51B.

<Tank Covers 52A, 52B>

In a case that the casing cover 2 is at the exposing position P12 (see FIG. 1B), each of the tank covers 52A and 52B is rotatable (pivotable), about the rotation axis located on the rear side of one of the bearings 53A to 53D, between a covering position P31 and an exposing position P32 (see FIG. 3A). In a case that the tank cover 52A is at the covering position P31, the tank cover 52A covers the holding member 51A, the cap 6A and the bearing 53A from thereabove. In a case that the tank cover 52B is at the covering position P31, the tank cover 52B covers the holding member 51B, the caps 6B to 6D and the bearings 53B to 53D from thereabove. The exposing position P32 is a position which is rotated, from the covering position P31, at an angle approximately in a range of 90 degrees to 100 degrees about the rotation axis of each of the tank cover 52A and the tank cover 52B.

<Liquid Containers 200A to 200D>

As depicted in FIG. 5B, in the MFP 100 (see FIGS. 1A and 1), for example, four liquid containers 200A to 200D are used for replenishing the tanks 4A to 4D with the inks, respectively. The liquid containers 200A to 200D are a remaining part of the liquid supplying apparatus. Note that in FIG. 5B, the liquid container 200A is illustrated to be greater than the liquid containers 200B to 200D, for the sake of convenience. The liquid container 200A stores a replenishing ink for the tank 4A (the ink of K color). The liquid container 200A is provided with a main body 8 and a container cap 9. The liquid container 200A is an example of a "liquid storing bottle", and the container cap 9 is an example of a "cap".

<Main Body 8>

In FIG. 6A, the main body 8 has a bottom part 81, a trunk part 82, a shoulder part 83, a base part 84, a circular wall 85 and a neck part 86.

<Bottom Part 81>

The bottom part 81 is a flat part of a bottom wall which has a substantially disc-shape. A posture assumed by the main body 8 in a case that the bottom part 81 is brought into contact with a horizontal plane 300 (see FIG. 5B) to thereby place the main body 8 on the horizontal plane 300 is referred to as a "placement posture". In the following explanation, unless otherwise noted, the posture of the main body 8 is the placement posture. A virtual line passing through the center of the bottom part 81 and orthogonal to the bottom part 81 is defined as an "axis Ax2". In an axial direction z2 in which the axis Ax2 extends, an orientation from the bottom part 81 toward the neck part 86 is also referred to as a separating orientation z21, and an orientation reverses to the separating orientation is also referred to as an approaching orientation z22. In a radial direction r1 of the axis Ax2, an orientation approaching toward the axis Ax2 is also referred to as an inward orientation r21, and an orientation reverse to the inward orientation r21 is also referred to as an outward orientation r22. FIGS. 5A, 5B, 6A and 6B depict only an example of each of the radial direction r2, the inward orientation r21 and the outward orientation r22.

<Trunk Part 82, Shoulder Part 83>

The trunk part 82 is a wall which has a substantially cylindrical shape extending from an outer edge of the bottom part 81 in the separating orientation z21. The shoulder part 83 is a wall which extends from an extending end of the trunk part 82 in the inward orientation r21. The shoulder part 83 is inclined with respect to the radial direction r2 of the axis Ax2 so as to further apart from the bottom part 81 as approaching closer to the axis Ax2. An extending end of the shoulder part 83 is away (apart) from the axis Ax2 in the outward orientation r22, and has a circular shape in a plan view from the approaching orientation z22 (hereinafter also referred to as a "second plan view").

<Base Part 84>

The base part 84 has a side wall and an upper wall. The side wall projects from the extending end of the shoulder part 83 in the separating orientation z21 (namely, upward) and has a substantially cylindrical shape which is substantially coaxial with the axis Ax2. The upper wall projects from the projecting end (namely, the upper end) of the side wall of the base part 84 in the inner orientation r21 and has a substantially ringed shape in the second plan view. In an upper wall of the base part 84, an upper surface 841 (an example of an "upper surface") defines an upper end of the base part 84, and is a surface parallel to the bottom part 81.

<Storing Chamber 87>

As depicted in FIGS. 7A and 7B, the main body 8 has a space which is defined by the bottom part 81, the trunk part 82, the shoulder part 83 and the base part 84, as a storing chamber 87. The ink of the K color which is to be supplied to the tank 4A and with which the tank 4A is to be replenished is stored in the storing chamber 87. The storing chamber 87 is an example of an "internal space" of the bottle body.

<Circular Wall 85>

In FIGS. 6A, 6B, 7A and 7B, the circular wall 85 has a bottomed cylindrical shape which is coaxial with the axis Ax2. In the circular wall 85, an end in the approaching orientation z22 is sealed (see FIG. 7A) so as to form a bottom surface 851 which is ring-shaped (which has an annular shape) in the second plan view. The bottom surface 851 is a surface which is positioned in the separating orientation z21 with respect to the upper surface 841, which is parallel to the upper surface 841 and which is oriented (faces) upward. The circular wall 85 projects in the separating orientation z21 from an outer edge of the bottom surface 851, and extends up to a position which is apart, with the upper surface 841 as the reference, only by a distance Dz2 (an example of a "first size") in the separating orientation r21 (see FIG. 4B). The distance Dz2 is longer than the distance Dz1. The separating orientation r21 is upward in the placement posture. The circular wall 85 has an end surface 852 at an end thereof in the separating orientation z21. The end surface 852 is ring-shaped in the second plan view, and expands parallel to the upper surface 841. The end surface 852 surrounds an opening in the separating orientation z21 of the circular wall 85. A width in the radial direction r2 of the circular wall 85 is substantially constant over the entire area thereof in a circumferential direction 62, and is not more than a distance in the left-right direction x1 between the rib 462 and the connecting plate 73 (see FIG. 4A). With the above-described configuration, the circular wall 85 is insertable to a space between the receiver key member 46 and the projecting wall 45 in the external space 46E (see FIG. 4A), and the end surface 852 is capable of making contact with the upper surface 43 in the external space 46E (see FIG. 4A).

<Neck Part 86>

In FIGS. 6A, 6B, 7A and 7B, the neck part 86 is an example of a "nozzle", and has a large diameter part 861 and a small diameter part 862.

The large diameter part 861 is a substantially cylindrical body having an outer circumference surface 861A and a circular flat surface 861B. The outer circumferential surface 861A extends from the bottom surface 851 in the separating orientation z21, and projects up to a location above the upper surface 841. The outer circumferential surface 861A is apart from the circular wall 85 in the inward orientation r21 over the entire area thereof in the circumferential direction 62. The circular flat surface 861B extends from the projecting end of the outer circumferential surface 861A in the inward orientation r21 by a substantially constant distance. The circular flat surface 861B is ring shaped in the second flat view, and is substantially parallel to the upper surface 841.

The small diameter part 862 is a substantially cylindrical body having an outer circumference surface 862A, circular flat surfaces 862B, 862C and a circular inclined surface 862D. The outer circumferential surface 862A extends from an inner edge of the circular flat surface 861B in the separating orientation z21, and has a diameter smaller than that of the outer circumferential surface 861A. The circular flat surface 862B is ring-shaped in the second plan view, and extends from a projecting end of the outer circumferential surface 862A in the inward orientation r21 by a substantially constant distance and substantially in parallel to the upper surface 841. The circular flat surface 862C is a forward end surface in the separating orientation z21 of the neck part 86, and is ring-shaped in the second plan view. The circular flat surface 862C is an example of a "forward end surface", and is connected to the circular flat surface 862B via the circular inclined surface 862D at a position which is apart from the circular flat surface 862B in the inward orientation r21 and in the separating orientation z21.

The neck part 86 defines a channel 862F via which the ink stored in the storing chamber 87 passes. As depicted in FIGS. 7A and 7B, the channel 862F is continuous to the storing chamber 87 at an end in the approaching orientation z22 of the channel 862F, and is continuous to an outflow port 862E (an example of an "opening") which is formed in the circular flat surface 862C, at an end in the separating orientation z21 of the channel 862F. In the channel 862F, a part surrounded by the large diameter part 861 has a diameter larger than a diameter of a part, of the channel 862F, which is surrounded by the small diameter part 862 (see FIG. 7B). The outflow port 862E is circular shaped (round shaped) in the second plan view. The outflow port 862E has a diameter which is slightly larger than the needle 44 (see FIGS. 4A and 4B), and allows the ink flowing through the channel 862F to flow to the outside of the liquid container 200A.

In the present embodiment, the outer circumferential surfaces 861A and 862A, the circular flat surfaces 861B, 862B and 862C, the circular inclined surface 862D and the outflow port 862E are coaxial with the axis Ax2. However, the present embodiment is not limited to or restricted by this; it is allowable that the axis of at least one of the outer circumferential surfaces 861A and 862A, the circular flat surfaces 861B, 862B and 862C, the circular inclined surface 862D and the outflow port 862E is not coaxial with the axis Ax2. In the present embodiment, the outflow port 862E is round shaped in the second plan view. However, the present disclosure is not limited to this; the outflow port 862E may have a shape which is different from the round shape in the second plan view.

<Relationship Between Circular Wall 85 and Neck Part 86>

In FIGS. 7A and 7B, the circular wall 85 is positioned in the surrounding of the neck part 86, with a spacing distance from the neck part 86 in the outward orientation r22, and defines a cylindrical space 86A between the circular wall 85 and the neck part 86. In the separating orientation z21, a forward end of the circular wall 85 is apart from the bottom part 81 farther than the forward end of the neck part 86. In the placement posture, the forward end (namely, the upper end) of the circular wall 85 is positioned above the circular flat surface 862B (namely, the forward end surface) of the neck part 86.

<Key Member 88, First Rib 881, Second Rib 882 and Third Rib 883>

In FIG. 6B, the main body 8 is further provided with a key member 88. The key member 88 projects perpendicularly from the upper surface 841, the bottom surface 851 and the circular flat surface 861B in the separating orientation z21, at a position between the circular wall 85 and the small diameter part 862. In the placement posture, an upper end of the key member 88 is closer to the upper surface 841 than the upper end of the circular wall 85. The key member 88 includes a first rib 881, a second rib 882 and a third rib 883 which are in conformity to or are loosely in conformity to the receiver key member 46.

The first rib 881 connects to each of the small diameter part 862 and the circular wall 85. As the first rib 881, three first ribs 881A to 881C are exemplified in FIG. 6B. Each of the first ribs 881A to 881C projects perpendicularly from the bottom surface 851 and the circular flat surface 861B in the separating orientation z21. An inner end and an outer end of each of the first ribs 881A to 881C are integral, respectively, to the small diameter part 862 and the circular wall 85. A projecting end of each of the first ribs 881A to 881C expands, in the axial direction z2, substantially parallel to the upper surface 841 at a position closer to the end surface 852 of the circular wall 85 than the circular flat surface 861B.

The first ribs 881A and 881B have shapes, respectively, which are rotationally moved from each other by approximately 180 degrees in the circumferential direction θ2 of the axis Ax2. The projecting end surface of each of the first ribs 881A and 881B is flush with the circular flat surface 862B. At the time of ink replenishment, the first rib 881A has a size which is insertable to a gap between the ribs 464 and 465 (see FIG. 4A) from thereabove; and the first rib 881B has a size which is insertable to a gap between the ribs 462 and 463 (see FIG. 4A) from thereabove.

The first rib 881C is apart only by an angle Dθ4 in an orientation θ21 in the clockwise orientation in the circumferential direction θ2, with the first rib 881A as the reference, in the second plan view. The angle Dθ4 is greater than angles Dθ5 angle Dθ6 which will be described later on. A projecting end surface of the first rib 881C is positioned, in the axial direction z2, to a slight extent in the approaching orientation z22 with respect to the circular flat surface 862B, and defines a stepped part (a difference in height) with respect to the circular flat surface 862B. The first rib 881C has a size fittable to the cutout 468A (see FIG. 4A) from thereabove at the time of ink replenishment.

Although the second rib 882 connects to the small diameter part 862, the second rib 882 does not connect to the circular wall 85. In FIG. 6B, one piece of a second rib 882A is exemplified as the second rib 882. The second rib 882A extends linearly, in the second plan view, in the outward orientation r22 along the circular flat surface 861B from a position, in the outer circumference surface 862A, which is apart only by an angle Dθ5 (see The. 8A) in the orientation θ21, with the first rib 881A as the reference. The second rib 882A extends linearly, in the second plan view, in the outward orientation r22 along the circular flat surface 861B also from a position, in the outer circumference surface 862A, which is apart only by an angle Dθ6 (see FIG. 8A) in the orientation θ21 from the first rib 881A. The angle Dθ5 is greater than 0 (zero), and the angle Dθ6 is greater than the angle Dθ5. The second rib 882A extends in a circular-arc shape along an outer edge of the circular flat surface 861B between the angles Dθ5 and Dθ6. Although the respective projecting end surfaces in the separating orientation z21 of the second rib 882A expand substantially parallel to the upper surface 841, the respective projecting end surfaces are positioned in the approaching orientation z22 to some extent with respect to the circular flat surface 862B, and define a stepped part (difference in height) with respect to the circular flat surface 862B. The width of the second rib 882A is substantially constant over an entire area in an extending direction in which the second rib 882A extends. The second rib 882A has a size loosely fittable to the partially circular space 46D (see FIG. 4A) at the time of ink replenishment.

Although the third rib 883 does not connect to the small diameter part 862, the third rib 882 connects to the circular wall 85. In FIG. 6B, one piece of a third rib 883A is exemplified as the third rib 883. The third rib 883A is positioned in the outward orientation r22 to be apart with respect to the small diameter part 862. The third rib 883A extends in a circular arc shape, in the second plan view, along the outer edge of the circular flat surface 861B within a range from an angle Dθ7 (see FIG. 8A) up to an angle Dθ8 (see FIG. 8A) in a counterclockwise orientation in the circumferential direction θ2, with the first rib 881A as the reference. The angle Dθ7 is greater than 0 (zero), and the angle Dθ8 is greater than the angle Dθ7. The third rib 883A extends in the outward orientation r22 from the both ends in the circumferential direction θ2 toward the circular wall 85, and connects to the circular wall 85. A projecting end surface in the separating orientation z21 of the third rib 883A expands parallel to the upper surface 841, and is positioned in the approaching orientation z22 with respect to the end surface 852. The projecting end surface has a stepped part (difference in height) within a range from an angle Dθ9 (see FIG. 8A) up to an angle Dθ10 (see FIG. 8A) in the orientation θ22, with the first rib 881 as the reference. The angle Dθ9 is greater than the angle Dθ7. The angle Dθ10 is greater than the angle Dθ9 and is smaller than the angle Dθ8. The width of the third rib 883A is substantially constant over an entire area in an extending direction in which the third rib 883A extends. The third rib 883A has a size loosely fittable to a space between the ribs 462 and 4610 in the external space 46E, at the time of ink replenishment.

<Male Screw 854, Recessed Parts 855A, 855B>

In FIGS. 6B, 7A and 7B, the main body 8 has a male screw 854 in the outer circumferential wall 853 of the circular wall 85. The male screw 854 projects in the outward orientation r22 from the outer circumferential surface 853 of the circular wall 85. The male screw 854 has a helical shape which moves in the outer circumferential surface of the circular wall 85, in the approaching orientation z22 at a position which is apart from the end surface 852 in the approaching orientation z22 only by a distance Dz3 (see FIG. 4B), while rotating about the axis Ax2. The distance Dz3 is an example of a "third size", and is longer than the distance Dz1. Recessed part 855A and 855B (each an example of a "recessed part") are formed in the male screw 854. The recessed part 855A is formed by cutting out, in the male screw 854, at least a part thereof in the outward orientation r22 with respect to the first rib 881A. The recessed part 855A is recessed toward the first rib 881A with respect to a virtual line c1 (see a broken line in FIG. 6B) which is obtained by virtually extending an apex of the male screw 854.

As depicted in FIG. 8A, positions which are apart, to some extent, from the first rib 881A respectively in the orientation θ21 and θ22 are defined as positions P41 and P42, respectively. Positions which are apart from the positions P41 and P41 respectively in the orientation θ21 and θ22 are defined as positions P51 and P52, respectively. A line linking the position P41 at the foot of the screw thread of the male screw 854 and the position P51 at the apex of the screw thread is defined as a line L11. Aline linking the position P42 at the foot of the screw thread of the male screw 854 and the position P52 at the apex of the screw thread is defined as a line L12. In the second plan view, by cutting out a part, in the male screw 854, which is surrounded by the outer circumferential surface 853, the virtual line c1 and the lines L11 and L12, the recessed part 855A is formed.

The recessed part 855B has a shape which is obtained by rotating the recessed part 855A by 180 degrees in the circumferential direction θ2.

<Valve Mechanism 88>

In FIG. 7B, the main body 8 is further provided with a valve mechanism 89 in the channel 862F. The valve mechanism 89 has a rubber part 891, a supporting member 892, a valve body 893 and a coil spring 894.

The rubber part 891 has a bottomless cylindrical shape, and is inserted into the channel 862F so as to be coaxial with the axis Ax2. At the time of insertion, an outer circumferential surface and one end surface of the rubber part 891 make tight contact with the internal surface of the small diameter part 862. An inner circumferential surface of the rubber part 891 has a diameter which is substantially same as that of the outflow port 862E, except for the other end of the inner circumferential surface of the rubber part 891. The other end in the inner circumferential surface of the rubber part 891 projects slightly in both of the inward orientation r21 and the approaching orientation z22, thereby making the diameter of the other end of the inner circumferential surface of the rubber part 891 to be slightly smaller than the outflow port 862E and/or the needle 44 (see FIGS. 4A and 4B). A size in the axial direction z2 of the rubber part 891 is shorter than that of the neck part 86.

The supporting member 892 is, for example, an integrated molded item formed of a resin, and is attached to the channel 862F so as to bring the rubber part 891 into tight contact with the small diameter part 862. The supporting member 892 has four side parts 892A and a bottom part 892B. For the sake of convenience, only three side parts 892A are depicted in FIG. 7B. Each of the side parts 892A is fixed in the inner circumferential surface of the small diameter part 862, at a position in the approaching orientation z22 with respect to the rubber part 891. A forward end of each of the side parts 892A makes contact with the other end surface of the rubber part 891. The respective side parts 892A are arranged side by side with equal spacing distances in the circumferential direction 62; each of the side parts 892A extends from a forward end thereof toward the storing chamber 87, along the inner circumferential surface of the small diameter part 862. As appreciated from FIG. 9B, the bottom part 892B is cross-shaped in the second plan view, and extends from a position which is apart from the other end surface of the rubber part 891 in the approaching orientation z22 and which is in the vicinity of the axis Ax2, radially toward the ends in the approaching orientation z22, respectively, of the side parts 892A, and is linked or connected to the ends of the respective side parts 892A. The respective side parts 892A and the bottom part 892B of the supporting member 892 define or demarcates an accommodating space. The accommodating space is substantially cylindrical shaped, and accommodates the valve body 893 and the coil spring 894 therein.

The valve body 893 and the coil spring 894 are accommodated or stored in the accommodating space of the supporting member 892. The valve body 893 is accommodated to be movable in the axial direction z2 in the inside of the accommodating space. The valve body 893 has a circular shape in the second plan view, and has a diameter which is substantially same as the accommodating space having the cylindrical shape. The coil spring 894 is a torsion coil spring, and is positioned between the bottom part of the supporting member 892 and the valve body 893 in the accommodating space. The coil spring 894 makes contact with the valve body 893 in the inside of the accommodating space, and urges the valve body 893 in the separating orientation z21. With this, in a case that a contact force in the approaching orientation z22 is not applied from the needle 44 to the valve body 893, the valve body 893 makes tight contact with the other end surface of the rubber part 891, which in turn prevents the ink in the storing chamber 87 from leaking from the outflow port 862E.

<Liquid Containers 200*b* to 200*d*>

The liquid containers 200B to 200D are similar to the liquid container 200A, except for the following points. In each of the liquid containers 200B to 200D, the key member is constructed by a combination of at least one kind or two kinds of a first rib, a second rib and a third rib which are similar to the first rib 881, the second rib 882, the third rib 883, respectively. Here, the combinations of the respective ribs including the first, second and third ribs are mutually different among the liquid containers 200A to 200D. The three-dimensional shapes of the respective key members are mutually different among the liquid containers 200B to 200D, and are also different from the three-dimensional shape of the key member 88. The three-dimensional shape of the key member is a shape which is defined by the sizes and/or the positions in the axial direction z2, the circumferential direction θ2 and the radial direction r2 of the respective ribs or by the number (quantity) of the respective ribs. Other than this, the liquid containers 200B, 200C and 200D are different form the liquid container 200A in view of a point that the liquid containers 200B to 200C store, respectively, the inks of the C color, the M color and the Y color. It is also allowable that the liquid containers 200B to 200D are different from the liquid container 200A in view of the ink capacity (an amount of the ink storable therein).

<Container Cap 9>

As apparent from FIG. 5B and FIGS. 6A and 6B, the container cap 9 is a single member, and is attachable and detachable with respect to the main body 8. In the following, unless specifically noted, the term "container cap 9" means the container cap 9 attached to the main body 8. In FIG. 8B, the container cap 9 is provided with a ceiling wall 91, a side wall 92 and a female screw 93.

<Ceiling Wall 91>

As depicted in FIG. 5B, the ceiling wall 91 is a wall having a substantially disc-shape which is coaxial with the axis Ax1. In FIG. 8B. the ceiling wall 91 has two main surfaces which are an outer main surface 911 and an inner main surface 912 which are apart from each other in the axial direction z2. The inner main surface 912 is positioned in the approaching orientation z22 with respect to the outer main surface 911.

<Engaging Part 913 (an Example of a "Sealing Part"), Engaging Part 914 (an Example of a "Circular Contacting Part">

An engaging part 913 projects, in the inner main surface 912 of the ceiling wall 91, in the approaching orientation z22 at a location close to the axis Ax1. The engaging part 913 has a substantially ring shape in the second plan view. The engaging part 913 makes contact liquid-tightly with the circular flat surface 862C of the main body 8, over the entire area thereof in the circumferential direction 62. With this, in an attached state of the container cap 9, the engaging part 913 seals, together with the ceiling wall 91, the outflow port 862E.

An engaging part 914 projects, in the inner main surface 912 of the ceiling wall 91, in the approaching orientation z22 at a location close to the side wall 92 than the engaging part 913. The engaging part 914 has a substantially ring shape in the second plan view. The engaging part 914 makes contact liquid-tightly with the end surface 852 of the circular wall 85, over the entire area thereof in the circumferential direction 62. With this, in the attached state of the container cap 9, the engaging part 914 seals, together with the ceiling wall 91, the opening of the cylindrical space 86A (see FIGS. 6A and 6B).

It is allowable that the engaging parts 913 and 914 are produced of a same material as that of the ceiling wall 91, and are integrated with the ceiling wall 91. The present disclosure is not limited to this, and the engaging parts 913 and 914 may be formed of a material having more flexibility than that of the ceiling wall 91, for example, of rubber, elastomer, etc., and may be a separate body from the ceiling wall 91.

<Side Wall 92, Female Screw 93>

As depicted in FIG. 8B, the side wall 92 is a wall having a substantially cylindrical shape which extends in the approaching orientation z22 from the outer edge of the inner main surface 912, and has an inner circumferential surface 921 and an outer circumferential surface 922 which are apart from each other in the radial direction r1. The inner circumferential surface 921 has a diameter which is greater to some extent than the outer circumferential surface 853 (see FIG. 6B) of the circular wall 85. The female screw 93 is formed in the inner circumferential surface 921 and is capable of being screwed (threadedly engaged) with respect to the male screw 814 of the main body 8. The container cap 9 is placed to the circular wall 85 from thereabove to cover the circular wall 85 to thereby position the side wall 92 in the outer orientation r22 with respect to the outer circumferential surface 853. In a case that the male screw 854 is being screwed with respect to the female screw 93 by rotating the container cap 9 in the circumferential direction 62 in this state, an end, of the side wall 92, in the approaching orientation z22 makes contact with the upper surface 841 of the base part 84, in the entire circumference thereof. A state that the end of the side wall 92 substantially makes contact with the upper surface 841 is an attached state in which the container cap 9 is attached to the main body 8. By allowing the female screw 93 of the container cap 9 to be screwed with respect to the male screw 854 formed in the main body 8, the container cap 9 is attached to the main body 8 easily and in an ensured manner. Further, even in a case that the liquid container 200A is dropped, the container cap 9 is less likely to be detached from the main body 8.

After screwing the male screw 854 with respect to the female screw 93, an end in the approaching orientation z22 of the side wall 92 (namely, an extending end of the side wall 92) substantially makes contact with the upper surface 841 over the entire circumference thereof, and is stopped in the axial direction z2. The size in the axial direction z2 of the side wall 92 is determined so that the extending end of the side wall 92 makes contact with the upper surface 841 in the attached state. At least the shape of the engaging part 913 and the size in the axis direction z2 and the size in the radial direction r2 of the engaging part 913 are determined so that in the attached state, the engaging part 913 make contact with the circular flat surface 862C. At least the shape of the engaging part 914 and the size in the axis direction z2 and the size in the radial direction r2 of the engaging part 914 are determined so that in the attached state, the engaging part 914 make contact with the end surface 852 of the circular wall 85.

<Replenishment of Tank 4A with Ink from Liquid Container 200A>

In a case that the tank 4A is replenished with the ink inside the liquid container 200A, an operator moves the casing cover 2 in the MFP100 from the shielding position P11 to the exposing position P12 (see FIGS. 1A and 1*i*), moves the tank cover 52A from the covering position P31 (see FIG. 1B) to the exposing position P32 (see FIG. 3A), and moves the cap 6A from the closing position P21 (see FIG. 3A) to the opening position P22 (see FIG. 5A). The operator detaches the container cap 9 in the liquid container 200A from the main body 8 (see FIGS. 5B, 6A).

Next, as understood from FIGS. 9A and 9A, the operator turns the outflow port 862E of the liquid container 200A to be oriented downward and causes the key member 88 (see FIGS. 6A and 6B) to approach closely to the key hole 48 (see FIGS. 4A and 4B) provided on the MFP 100. Even in a case that the outflow port 862E is oriented downward, the valve body 893 makes tight contact with the rubber part 891 by the urging force of the coil spring 894, and thus the ink inside the storing chamber 87 does not leak out to the outside of the liquid container 200.

Next, the operator positions the key member 88 with respect to the key hole 48. By the positioning, the end surface 852 of the circular wall 85 is positioned immediately above the external space 46E. Further, the lower end of the first rib 881A is positioned immediately above the gap defined by the ribs 464 and 465, the lower end of the first rib 881B is positioned immediately above the gap defined by the ribs 462 and 463, and the lower end of the first rib 881C is positioned immediately above the cutout 468A. The lower end of the second rib 882A is positioned immediately above the partially circular space 46D, and the third rib 883A is positioned, in the external space 46E, immediately above the part thereof between the ribs 462 and 4610. The outflow port 862E of the liquid container 200A is positioned immediately above the upper end of the needle 44 of the tank 4A.

In a process up to the completion of the positioning, the operator turns the recessed parts 855A and 855B of the liquid container 200 leftward and rightward. With this, the operator is capable of positioning the lower ends of the first ribs 881A and 881B substantially immediately above the ribs 462 to 465, even if the operator is unable to visually recognize the key member 88. With this, the positioning can be performed easily.

After completing the positioning, the operator moves the key member 88 of the liquid container 200A downward, in the inside of the key hole 48. Specifically, the first rib 881A moves downward between the ribs 464 and 465, and the first rib 881B moves downward between the ribs 462 and 463. Apart in the vicinity of the outer edge of the first rib 881C is moves downward into the inside of the cutout 468A. The second rib 882A moves downward into the inside of the partially circular space 46D. The third rib 883A moves downward, in the external space 46E, to the part thereof between the ribs 462 and 4610. The outer circumferential surface 862A moves downward while making contact with the inner ends, respectively, in the ribs 462 to 466 and the inner circumferential surface of the rib 467.

There is such a case that the operator is unable to move the key member 88 downward inside the key hole 48. As one of the factors of such a case, the lower end of the first rib 881A is positioned erroneously immediately above the space defined by the ribs 462 and 463, and the lower end of the first rib 881B is positioned erroneously immediately above the space defined by the ribs 464 and 465. In this case, since the key member 88 does not move downward inside the key hole 48 due to such a reason, for example, that the lower end of the first rib 881C interferes with the upper end of the rib 469, etc., the operator rotates the liquid container 200A by 180 degrees in the circumferential direction θ2, and positions the lower ends, respectively, of the first ribs 881A and 881B to the correct positions thereof, respectively. Afterwards, the operator moves the key member 88 downward in the inside of the key hole 48.

In the process in which the key member 88 is (being) moved downward inside the key hole 48, the needle 44 is inserted from the outflow port 862E of the liquid container 200A to the channel 862F, and approaches toward the valve body 893. After the upper end of the needle 44 makes contact with the lower end of the valve body 893, the valve body 893 starts moving upward, by the contact force received from the upper end of the partition wall 443 of the needle 44, against the urging force of the coil spring 894. In response to a situation that the circular flat surface 862C enters into the circular space 48B, and the circular flat surface 862B makes contact with the contact surface 461A, and the end surface 852 of the circular wall 85 reaches the upper surface 43 in the external space 46E, the key member 88 of the tank 4 is engaged to the key hole 48 of the main body 8, thereby completing the connection of the main body 8 to the tank 4A.

At the time of completion of the connection, the contact surface 461A makes contact with the circular flat surface 862B of the small diameter part 862 which is positioned in the cylindrical space 46A. The inner ends, respectively, of the ribs 462 to 466 and the inner circumferential surface of the rib 467 make contact, over the entire area thereof in the up-down direction z1, with the outer circumferential surface 862A of the small diameter part 862 which is in the inside of the cylindrical space 46A. The rib 467 further makes contact with the inner circumferential surface of the third rib 883A from the side of the inward orientation r21. At the time of completion of the connection (an example of a "connected state"), the end surface 852 of the circular wall 85 makes contact with the upper surface 43 at a position which in in the inner orientation r21 with respect to the projecting wall 45. Owing to this, even in a case that the operator removes his or her hand from the main body 8, the main body 8 is supported by the upper surface 43, the projecting wall 45 and the receiver key member 46 of the key hole 48 as depicted in FIGS. 9A and 9B, and stands in an inverted manner, without hardy being inclined with respect to the up-down direction z1.

At the time of completion of the connection, the valve body 893 releases the channel 862F by the contact force from the forward end of the partition wall 443. Since the forward end of the partition wall 443 projects to a location above the upper ends, respectively, of the channels 441 and 442, gaps are defined each between the valve body 893 and the channel 441 and between the valve body 893 and the channel 442. With these gaps, the storing chamber 87 of the main body 8 and the storing chamber 47 of the tank 4A communicate with each other via the channels 441, 442 and 862F. Namely, the main body 8 and the tank 4A are connected so as to allow the ink to flow out from the storing chamber 87 to the storing chamber 47.

There is such a case that the ink adheres to the surface of the neck part 86, etc. In a process that the neck part 86 approaches toward the contact surface 461A in the inside of the cylindrical space 46A, the ink leaking out from a location between the neck part 86 and the contact surface 461A flows into the partially circular spaces 46C and 46D and/or flows into the external space 46E via the gap between the ribs 462 and 463 and the gap between the ribs 464 and 465. Further, the ink overflowed from the partially circular spaces 46C and 46D flows out to the external space 46E via the cutouts 486A and 469A.

Since immediately after the completion of connection, gas-liquid replacement starts between the liquid container 200A and the tank 4A. In the gas-liquid replacement, the ink inside the storing chamber 87 flows into the storing chamber 47 via the channels 862F and 441. In the gas-liquid replacement, air flows from the atmosphere communicating hole of the tank 4A into the storing chamber 47, and this air flows into the storing chamber 87 via the channels 442 and 862F. An outflow amount of the ink from the storing chamber 87 to the storing chamber 47, and an inflow amount of the air from the storing chamber 47 to the storing chamber 87 are substantially same. In a case that the liquid surface of the ink in the storing chamber 47 reaches the lower end of the flow channel 442 or that the ink inside the storing chamber 87 becomes empty, the gas-liquid replacement is ended. In such a manner, the tank 4A is replenished with the ink inside the liquid container 200A.

After the ending of the ink replenishment, the operator pulls the key member 88 and the neck part 86 of the liquid container 200A upward from the key hole 48 and the needle 44 of the tank 4A. In a process in which the neck part 86 is (being) moved upward with respect to the needle 44, the valve body 893 first maintains a state that the valve body 893 makes contact with the upper end of the partition wall 443 of the needle 44 by the urging force of the coil spring 894. After the valve body 893 makes contact with the small diameter part 862 of the neck part 86, the valve body 893 is apart from the upper end of the circular wall 443.

Afterward, the operator attaches the container cap 9 to the main body 8 (see FIGS. 5B and 6A). With this, the ink remaining in the inside of the storing chamber 87 of the liquid container 200A is preserved. The operator moves the casing cover 2 in the MFP 100 from the exposing position P12 to the shielding position P11 (see FIGS. 1A, 1), moves the tank cover 52A from the exposing position P32 (see FIG. 3A) to the covering position P31 (see FIG. 1), and moves the cap 6A from the opening position P22 (see FIG. 5A) to the closing position P21 (see FIG. 3A). In a case that the tank 4A is replenished with the ink inside of the liquid container 200A in another occasion, the operator replenishes the tank 4A with the ink in a procedure which is similar to that described above.

<Prevention of Erroneous Connection of Liquid containers 200B to 200D to Tank 4A>

In a case that the operator attempts to erroneously connect any one of the liquid containers 200B to 200D to the key hole 48 of the tank 4A, the shape and/or the position in the left-right direction x1 and/or the front-rear direction of at least one of the ribs 462 to 4610 constructing the key hole 48 does or do not match the key member of each of the liquid containers 200B to 200D which is wrong (not matching) with respect to the tank 4A, in some cases, which in turn results in such a case that the key member is not in conformity to the key hole 48. Owing to this, the operator can quickly recognize that the operator is attempting to fit any one of the liquid containers 200B to 200D erroneously to the tank 4A. Further, it is also possible to quickly prevent the tank 4A from being replenished with an ink which is wrong with respect to the tank 4A.

Furthermore, in such a case that the operator attempts to erroneously fit any one of the liquid containers 200B to 200D to the key hole 48 of the tank 4A, the shape and/or the position in the up-down direction z1 of at least one of the ribs 462 to 4610 constructing the key hole 48 does or do not match the key member of each of the liquid containers 200B to 200D which is wrong (not matching) with respect to the tank 4A, in some cases. In this case, since any one of the liquid containers 200B to 200D does not move downward, the operator can quickly recognize that the operator is attempting to fit any one of the liquid containers 200B to 200D erroneously to the tank 4A. Moreover, it is also possible to prevent the tank 4A from being replenished with an ink which is wrong with respect to the tank 4A.

Technical Effects of Embodiment

In the ink replenishment, the outflow port 862E of the main body 8 is oriented downward and thus the ink easily adheres to the surrounding of the outflow port 862E; thus, in a process of making the liquid container 200A to be in the placement position after the ink replenishment, this ink remains, along an outer surface of the neck part 86, between the circular wall 85 and the neck part 86. With this, during a process of replenishing the tank 4A with the ink again, the ink is less likely to adhere to a hand and/or a finger of the operator and/or to a place in which the liquid container 200A is placed (for example, the desktop, etc.). Further, in the attached state wherein the container cap 9 is attached to the main body 8, the engaging part 913 seals the outflow port 862E and thus the ink remaining between the circular wall 85 and the neck part 86 does not flow back to the outflow port 862E. Furthermore, in the attached state, the opening of the cylindrical space 86A (see FIG. 6B) is sealed by the engaging part 914, and thus the ink inside the cylindrical space 86A is prevented from flowing down or streaming along the outer circumferential surface 853 of the circular wall 85 and from adhering to the outer surfaces, respectively, of the base part 84, the shoulder part 83 and the trunk part 82. Further, the ink is prevented from adhering to the side wall 92 of the bottle cap. With this, the ink is less likely to adhere to the hand and/or the finger of the operator and/or to the place wherein the liquid container 200A is placed.

By performing the cutting out in the male screw 854, the recessed parts 855A and 855B are formed at two locations, respectively, of the outer circumferential surface 853. The recessed parts 855A and 855B are used, by the operator in the positioning in the ink replenishment, as the indicators indicating the positions of the first ribs 881A and 881B, respectively, each of which is a part of the key member 88. Owing to such recessed parts 855A and 855B, the operator is capable of easily position the key member 88 with respect to the key hole 48.

The key member 88 is formed in the cylindrical space 86A, and is not formed on the outer circumferential surface 853 of the circular wall 85. Such an outer circumferential surface 853 is formed with the male screw 854. Accordingly, the key member 88 does not affect the screwing (threadedly engagement) of the male screw 854 and the female screw 93. With this, the container cap 9 is attached to the main body 8 easily and in an ensured manner.

The key member 88 is formed in the cylindrical space 86A, and is loosely in conformity to the key hole 48 formed in the tank 4A. The number (quantity), the three-dimensional shape and/or the position of the ribs constructing the key member 88 and the key hole 48 are changed per each of the liquid containers 200A and 200D. Accordingly, the operator is capable of grasping the kind of the liquid containers 200A to 200D by the shape of the key member 88.

In the ink replenishment, the ink adhered to the neck part 86 easily drips down from the neck part 86. The forward end of the circular wall 85, however, projects in the separating orientation z21 with respect to the forward end of the neck part 86. Accordingly, even in a case that the ink drips down when the main body 8 is inclined so that the orientation of the outflow port 862E is reversed, the ink is easily made to drip down to the inside of the circular wall 85. Further, in a case, for example, that the main body 8 is dropped down from the desk, etc., the circular wall 85 collides against the floor, etc., faster than the neck part 86, and thus the neck part 86 can be protected from the impact.

The operator is capable of replenishing the tank 4A with the ink by using the liquid container 200A a plurality of times. Each time the ink replenishment is performed, as appreciated from FIG. 9B, since the outflow port 862E of the main body 8 is oriented downward, the ink easily adheres to the surrounding of the outflow port 862E. In the process of making the liquid container 200A to be in the placement position after the ink replenishment, the ink flows down the outer circumferential surface of the neck part 86 and remains in the cylindrical space 86A between the circular wall 85 and the neck part 86. In the next ink replenishment, in a case that the outflow port 862E is oriented downward, the ink inside the cylindrical space 86A moves downward toward the upper surface 43 of the tank 4A. However, at the time of completion of the connection, the end surface 852 of the circular wall 85 makes contact with a position, in the upper surface 43, in the inner orientation r21 with respect to the projecting wall 45. Accordingly, the ink remains in the external space 46E, does not leak from the projecting wall 45 in the outward orientation r22 in the upper surface 43, and does not flow down the outer surface of the tank 4A, including the upper surface 43.

As depicted in FIG. 4B, the distance Dz1 of the projecting wall 45 and the distances Dz2 and Dz3 in the circular wall 85 are in a relationship of Dz2>Dz3>Dz1. Under this relationship, by making a distance in the left-right direction x1 between the connecting plates 73 and 74 to be longer to some extent than the diameter of the outer circumferential surface 853 (see FIG. 6B) of the circular wall 85, it is possible to make the three-dimensional shape of the projecting wall 45 to be small, without any interference between the projecting wall 45 and the male screw 854.

While the present disclosure has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

Modification

In the following, a body 41, a main body 8 and a container cap 9 according to a modification will be explained, with reference to FIGS. 10A, 10B, 11A, 11B and 12. In the following, the difference from the embodiment will be mainly explained, a configuration which corresponds to that explained in the embodiment is denoted by a same reference numeral, and any explanation therefor will be omitted or simplified.

<Body 41, Curved Plates 71 and 72, Connecting Plates 73 and 74>

In FIG. 10A, the upper ends of the curved plates 71 and 72 and the connecting plates 73 and 74 are different from those in the embodiment in view of that the upper ends of the curved plates 71 and 72 and the connecting plates 73 and 74 are positioned above the upper end of the needle 44.

The connecting plate 74 is different from that of the embodiment in view of that a rib 741, a groove 742 and a slit 743 are arranged side by side from the front to the rear in this order.

The rib 741 perpendicularly projects to the left side, in the inner surface of the connecting plate 74 at a location in front of the needle 44. The rib 741 is continuous between both ends in the up-down direction z1 of the connecting plate 74, and extends linearly in the up-down direction z1. The rib 741 has a rectangular plate-like shape which is thin in the front-rear direction y1 and elongated in the up-down direction z1 in a first front view (which is in a plan view from the front).

The groove 742 is positioned on the right side as seen from the needle 44, is continuous between the both ends in the up-down direction z1 of the connecting plate 74, and extends linearly in the up-down direction z1. The groove 742 is recessed rightward from the inner surface of the connecting plate 71. The depth and/or the width of the groove 742 is/are substantially constant in an entire area, of the groove 742, between the both ends in the up-down direction z1 of the groove 742.

The slit 743 is continuous from a position, in the connecting plate 74, which is above to some extent from a lower end of the connecting plate 74 and the upper end of the connecting plate 74, and extends linearly in the up-down direction z1. A distance between the both ends in the up-down direction z1 of the slit 743 is substantially same as a distance between both ends in the axial direction z2 of a rib 813 (see FIGS. 11A and 11B). In the following, the distance between both ends in the up-down direction z1, and the distance between both ends in the axial direction z2 are each referred also simply as a "height". The width of the slit 743 is substantially constant over an entire area between the both ends in the up-down direction z1 of the slit 743.

In FIGS. 10A and 10B, the connecting plate 73 is different from that in the embodiment in view of that the connecting plate 73 is constructed of an inner plate 75 and an outer plate 76 which expand in the up-down direction z1 and the front-rear direction y1. The inner plate 75 faces the outer plate 76 in the left-right direction x1, at a position which is closer to the needle 44 to some extent than the outer plate 76. A slit 731 and a rib 732 are formed in the inner plate 75.

The slit 731 is positioned on the left side as seen from the needle 44, is continuous between a position which is to some extent above a lower end of the inner plate 75 and an upper end of the inner plate 75, and linearly extends in the up-down direction z1. The slit 731 has a substantially same height as a rib 815 (see FIGS. 11A and 11B). The width of the slit 731 is substantially constant in an entire area between both ends in the up-down direction z1 of the slit 731.

The rib 732 perpendicularly projects to the right side, in the inner surface of the inner plate 75 at a location behind the needle 44. The rib 732 is continuous between the upper end and the lower end of the inner plate 75, and extends linearly in the up-down direction z1. The rib 732 has a plate-like shape which is similar to that of the rib 741 of the connecting plate 74. A projecting end surface (namely, a right side surface) of the rib 732 expands in the up-down direction z1 and the front-rear direction y1, and is inclined to some extent with respect to the left-right direction x1.

In FIG. 10A, the curved plate 71 is different from that of the embodiment in view of that a projecting part 711 is formed in the curved plate 71. The projecting part 711 is positioned apart from the needle 44 at a location which is substantially in front of the needle 44, and is positioned in the vicinity of the center in the circumferential direction θ1 of the curved plate 71. The projecting part 711 has a substantially rectangular shape in the first plan view, and projects rearward from the inner surface of the curved plate 71. A rear end surface of the projecting part 711 is a circular arc shape in the first plan view (see FIG. 10B). A right side surface and a left side surface of the projecting part 711 are each a flat surface which is substantially orthogonal to the left-right direction x1. The projecting part 711 is continuous between the both ends in the up-down direction z1 of the curved plate 71, except for a part 712 which is on a rear right corner in the first plan view of the projecting part 711, and extends linearly in the up-down direction z1. The part 712 is a substantially parallelogram in the first plan view, is continuous between a lower end of the curved plate 71 and a location which is below the upper end of the curved plate 71, and extends in the up-down direction z1.

The projecting wall 45 partitions or defines a key hole 48 which is released upward, together with the ribs 741 and 732, the groove 742, the slits 743 and 731, the projecting part 711 and the part 712. The key hole 48 is an example of a "receiver key member" and/or an example of a "tank recessed part". A liquid container 200A, which is to be descried later on, is connected to the key hole 48 in a case of ink replenishment. Although the key hole 48 is in conformity to a key member 88 formed on the side of the liquid container 200A, the key part 48 is not in conformity to a key member of each of other liquid containers 200B to 200D.

<Circular Wall 85>

In FIGS. 11A and 11B, the circular wall 85 is different from that of the embodiment in view of having connecting plates 856 and 857 and curved plates 858 and 859. The circular wall 85 is different from that of the embodiment also in view of that an end surface in the separating orientation z21 of the circular wall 85 does not have a ring shape (annular shape).

Each of the connecting plates 856 and 857 is a flat plate having a substantially linear shape in the second plan view, and the connecting plates 856 and 857 face each other in the radial direction r2 with the neck part 86 being interposed therebetween. At the time of ink replenishment, the connecting plate 856 is positioned on the left side with respect to the connecting plate 74 of the projecting wall 45 (see FIG. 10A), and the connecting plate 857 is positioned on the right side with respect to the connecting plate 73 of the projecting wall 45 (see FIGS. 10A and 10B).

Each of the curved plates 858 and 859 has a circular arc shape located on a virtual circle c2 (see FIG. 11B) in the second plan view, and the curved plates 858 and 859 face each other in the radial direction r2 with the neck part 86 being interposed therebetween. The virtual circle c2 is a circle having the axis Ax2 as the center thereof in the second plan view, and has a diameter which is smaller to some extent than that of the upper surface 841 of the base part 84. Specifically, the planar shape of the upper surface 841 of the base part 84 is substantially circular. The curved plate 858 extends, in the upper surface 841, in the separating orientation z21 from a position along the virtual circle c2. The curved plate 859 extends, on the upper surface 841, in the axial direction z2 from a position which is rotationally moved approximately by 180 degrees, from the position occupied by the curved plate 858 on the upper surface 841, in a circumferential direction θ2 of the axis Ax2. The curved plate 858 is connected or linked to one ends, respectively, of the connecting plates 856 and 857, which are located to approach toward each other in the circumferential direction θ2. The other ends, respectively, of the connecting plates 856 and 857 are connected to each other by the curved plate 859. The curved plate 858 has such a shape that, at the time of ink replenishment, the curved plate 858 is overlapped with the curved plate 71 of the projecting wall 45 at a position immediately behind the curved plate 71 (see FIGS. 10A and 10B) of the projecting wall 45; the curved plate 859 has such a shape that, at the time of ink replenishment, the curved plate 859 is overlapped with the curved plate 72 of the projecting wall 45 (see FIGS. 10A and 10B) of the projecting wall at a position immediately in front of curved plate 72.

In FIGS. 11A and 11B, ribs 811 to 813 project perpendicularly from the outer surface of the connecting plate 856 toward the outside of the circular wall 85. Among the ribs 811 to 813, the rib 811 is positioned closest to the curved plate 858 and the rib 813 is positioned closest to the curved plate 859. The ribs 811 to 813 are continuous at both ends in the axial direction z2 of the connecting plate 856, and extend linearly in the axial direction z2. Each of the ribs 811 to 813 has a substantially same height as the slit 743 (see FIG. 10A) in the tank 4A. The ribs 811 to 813 do not protrude, in the second plan view, from the upper surface 841 of the base part 84. Specifically, the maximum distance between the both ends in the projecting direction of the rib 811 is shorter than the distance between the both ends in the projecting direction of the rib 741 (see FIG. 10A) on the side of the tank 4A. In a case of comparing a distance from the axis Ax2 to the projecting end of the rib 811 in the radial direction r2 with a distance from the axis Ax2 to the outer circumferential surface of the curved plate 858 in the radial direction r2, the distance to the projecting end (an example of a "first distance") is shorter than the distance to the outer circumferential surface (an example of a "second distance") in order to avoid any interference with respect to the container cap 9. At a time of completing the connection, the rib 811 makes contact with the rib 741 on the side of the tank 4A (see FIG. 10A) from the rear side. In this situation, the projecting end (namely, the left end) of the rib 741 makes contact with the connecting plate 856 from the right side. The rib 812 is engaged to the groove 742 at a time of connecting the bottom 200A with the tank 4A; in this situation, the projecting end of the rib 812 makes contact with the bottom of the groove 742 from the left side. The rib 813 is inserted into the slit 743 at the time of completion of connection of the bottom 200A with the tank 4A. A part of the projecting end surface of the rib 813 is notched and forms a part of a male screw 814 (see FIG. 11A) which will be described later on.

In FIGS. 11A and 11B, a rib 815 and a groove 816 are formed on the outer surface of the connecting plate 857. The rib 815 projects perpendicularly and toward outside of the circular wall 85 in the outer surface of the connecting plate 857, at a location closer to the curved plate 858 than the groove 816. A projecting end of the rib 815 does not protrude, in the second plan view, from the upper surface 841 in the outward orientation r22. The rib 815 has a height which is substantially same as the height of the slit 731 (see FIGS. 10A and 10B). Specifically, ends in the approaching orientation z22, respectively, of the rib 815 and the connecting plate 857 are located at mutually same positions. On the other hand, an end in the separating orientation z21 of the rib 815 is at a location which is closer, to some extent, to the approaching orientation z22 than an end in the separating orientation z21 of the connecting plate 857, as depicted in FIG. 11A. Namely, a distance in the axial direction z2 from the upper surface 841 to the end in the separating orientation z21 of the rib 815 is shorter than a distance in the axial direction z2 from the upper surface 841 to the end in the axial direction z2 of the connecting plate 857. Note that the separating orientation z21 is the up-down direction z1 in the placement posture, and the end in the separating orientation z21 is the upper end in the placement posture. At the time of completing the connection, the rib 815 is inserted into the slit 731, and the end in the separating orientation z21 of the rib 815 makes contact with a lower end of the slit 731. The groove 816 is continuous between the both ends in the axial direction z2 of the connecting plate 857, and extends linearly in the axial direction z2. The groove 816 is recessed from the outer surface to the inner surface of the connecting plate 857. The bottom surface of the groove 816 is parallel to the circumferential direction θ2 in the first plan view. The width of the groove 816 is substantially constant between both ends in the axial direction of the connecting plate 857. At the time of the ink replenishment, the rib 732 (see FIGS. 10A and 10B) is engaged to the groove 816; in this situation, the projecting end of the rib 732 makes contact with the bottom of the groove 816 from the left side.

In FIGS. 11A and 11B, another part of the male screw 814 is formed in the outer circumferential surface of each of the curbed plates 858 and 859, at a location in the vicinity of the center in the axial direction z2. As described above, the part of the male screw 814 is formed also in the rib 813. Namely, the male screw 814 is formed in a divided manner in the projecting end surface of the rib 813 and the curved plates 858 and 859. Such a male screw 814 is screwed (threadedly engaged) with respect to a female screw 93 formed in the container cap 9.

A groove 817 is formed in the outer surface of the curved plate 858. The groove 817 is continuous between both ends in the axial direction z2 of the curved plate 858, at a location in a center part in the circumferential direction θ1 of the curved plate 858, and extends linearly in the axial direction z2. The groove 817 is recessed from the outer circumferential surface toward the inner circumferential surface of the curved plate 858. A bottom surface of the groove 817 is parallel to the circumferential direction θ2 in the first plan view. The width and the depth of the groove 817 are substantially constant between the both ends in the axial direction z2 of the curved plate 858, except for a part corresponding to a rib 818 which will be described later on. Specifically, the depth of the groove 817 is substantially same as a size in the front-rear direction y1 of the projecting part 711, and the width of the groove 817 is same as the maximum value of the size in the left-right direction x1 in the projecting part 711. A rib 818 is formed in the groove 817. The rib 818 extends, in the groove 817, from one side surface in the circumferential direction θ2 (a side surface in a clockwise orientation in FIGS. 11A and 11B) of the groove 817. The rib 818 extends from a location, in the groove 817, between both ends in the radial direction r2 of the groove 817, and expands in the radiation direction r2 and the circumferential direction θ2. The rib 818 has a shape which is substantially same as that of the part 712 (see FIG. 10A) on the side of the tank 4A, in the second plan view, and the rib 818 has a plate-like shape which is thin in the axial direction z2. An end surface in the separating orientation z21 of the rib 818 is apart (separated), in the approaching direction z22, from an end in the separating orientation z21 of the groove 817, by an amount corresponding to the height of the part 712 (see FIG. 10A).

The groove 817 is engaged to the projecting part 711 (see FIGS. 10A and 10B) at the time of completing the connection; in this situation, the end surface in the separating orientation z21 of the rib 818 makes contact with the part 712 from thereabove.

The circular wall 85 forms a key member 88 which is in conformity to the key hole 48 (see FIGS. 10A and 10B), together with the ribs 811 to 813, 815 and 818 and the grooves 816 and 817. In the embodiment, the key member 88 is positioned between the circular wall 85 and the neck part 86. In the present modification, however, the key member 88 is positioned at the outer surface of the circular wall 85, rather than being positioned between the circular wall 85 and the neck part 86.

<Seat Part 865, Seat Surface 865A>

In FIGS. 11A and 11B, the neck part 86 is different from that of the embodiment in view that the neck part 86 is provided with a seat part 865 having a seat surface 865A. The seat surface 865A has a substantially ring shape surrounding the entire circumference of the neck part 86 in the second plan view, at the outside of the neck part 86. The seat surface 865A is a surface parallel to the radial direction r2. Specifically, the seat surface 865A extends in the outward orientation r22 toward the circular wall 85 from the entire circumference of the outer circumferential surface, in the neck part 86, which is apart from the forward end surface in the approaching orientation z22. Namely, the seat surface 865A is at a position which is closer to the circular wall 85 in the radial direction r2 than the forward end surface of the neck part 86 and which is closer to the upper surface 841 and/or the storing chamber 87 in the axial direction z2 than the forward end surface of the neck part 86. Further, in the placement posture of the main body 8, the seat surface 865A is oriented upward at a location below the forward end surface of the neck part 86. Although the seat surface 865A is continuous with the inner surfaces, respectively, of the connecting plates 856 and 857 and the bottom wall of the groove 817, the seat surface 865A is not continuous with the inner surfaces, respectively, of the curved plates 858 and 859. The width in the radial direction r2 of the seat surface 865A becomes to a minimum width W11 between the neck part 86 and the bottom wall of the groove 817.

<Container Cap 9>

In FIG. 12, the container cap 9 is different from that of the embodiment in view of further having a circular projecting piece 94.

The circular projecting piece 94 is a wall having a substantially cylindrical shape and extending in the approaching orientation z22 from a position which is in the outward orientation r22 with respect to the engaging part 913 and which is in the inward orientation r21 with respect to the side wall 92. The inner circumferential surface of the circular projecting piece 94 is substantially coaxial with the outer circumferential surface of the neck part 86. The thickness of the circular projecting piece 94 is a size in the radial direction r1 between the inner circumferential surface and the outer circumferential surface of the circular projecting piece 94. This thickness is substantially constant over the entire circumference in the circumferential direction θ1, and is smaller slightly than the above-described minimum width W11 between the neck part 86 and the groove 817. In the attached state of the container cap 9, the circular projecting piece 94 makes contact with the outer circumferential surface of the neck part 86 in the main body 8, and is fitted between the neck part 86 and the outer circumferential surface of the circular wall 85.

In a process of screwing the male screw 814 with the female screw 93 (hereinafter also referred to as a "screwing process"), the inner circumferential surface of the circular projecting piece 94 slidably moves on the outer circumferential surface of the neck part 86, while rotating about the axis Ax2. After the screwing process, an end 941 in the approaching orientation z22 (namely, an extending end) of the circular projecting piece 94 makes contact with the seat surface 865A over the entire circumference thereof. By the contact between the end 941 and the seat surface 865A, an end position at which the container cap 9 is screwed with respect to the main body 8 is determined, and the screwing of the container cap 9 is stopped in the axial direction z2. The size in the axial direction z2 of the circular projecting piece 94 is previously determined so that the end 941 makes contact with the seat surface 865A in the attached state. Further, in a case that the container cap 9 is at the end position, the inner main surface 912 makes contact with an end surface in the separating orientation z21 of the circular wall 85. With this, the container cap 9 seals a space which is on the inner side with respect to the circular wall 85, in a liquid tight manner.

Other Modifications

In the embodiment, the four color inks are stored in the tanks 4A to 4D, respectively, as described above. It is allowable, however, that a pre-processing liquid (another example of the "liquid") which is discharged or ejected by the recording head 322 onto a sheet S, etc., prior to the discharge of the ink in the image recording is stored in the tanks 4A to 4D. Other than this, it is allowable that the tanks 4A to 4D store water (yet another example of the "liquid") which is used for cleaning or washing the recording head 322.

In the embodiment, the printer part 3 is capable of recording a full color image on the sheet S. The present disclosure, however, is not limited to or restricted by this; the printer part 3 may be capable of recording only a monochrome image on the sheet S. In such a case, the tank set 31 is provided with the tank 4A, the holding member 51A, the cap 6A and the tank cover 52A.

In the embodiment, the key hole 48 is provided on the tank 4A. The present disclosure, however, is not limited to this; the key hole 48 may be formed in the inner circumferential surface of the through hole 511A of the holding member 51A.

In the embodiment, the three-dimensional shape of each of the key member 88 and the key hole 48 is made to be mutually different per each of the colors of the inks. The present disclosure, however, is not limited to this; the three-dimensional shape of each of the key member 88 and the key hole 48 is made to be mutually different per each kind (namely, each model) of the MFP 100.

In the embodiment, each of the key member 88 and the receiver key member 46 is constructed of the cutout and the rib projecting in the separation orientation z21 with respect to the upper surface 841. The present disclosure, however, is not limited to this; other than this, each of the key member 88 and the receiver key member 46 may be constructed of a slit which is long in the approaching orientation z22 with respect to the upper surface 841 or a recessed part which is recessed in the circumferential direction θ 2 or the radial direction r2.

In the embodiment, the main body 8 is provided with the recessed parts 855A and 855B, and the recessed parts 855A and 855B are formed by performing cutting out the parts, in the male screw 854, which are rotationally moved with each other only by 180 degrees. The present disclosure, however, is not limited to this; the main body 8 may be provided with two projected parts, rather than the recessed parts 855A and 855B. The two projected parts may project from parts, respectively, in the outer circumferential surface 853, which are rotationally moved with each other only by 180 degrees.

The invention claimed is:

1. A liquid supplying apparatus comprising:

a liquid container having an internal space for storing liquid, the liquid container including:

a nozzle;

a first wall located around the nozzle; and a key member; and a tank having a receiver key member corresponding to the key member and a body defining a chamber for storing the liquid, the body including:

a tube connecting the chamber to an outside of the body; and a second wall located around the tube and extending in a direction in which the tube extends, wherein the tube is configured to be inserted into the liquid container so as to allow the liquid to flow out from the liquid container to the chamber of the tank, in a case where the liquid container is connected to the tank, the first wall is located between the tube and the second wall, and the first wall is protruded in a direction in which the nozzle extends less than a portion of the liquid container at which the tube is inserted.

2. The liquid supplying apparatus according to claim 1, wherein a first length of the first wall in a direction in which the nozzle extends is greater than a second length of the second wall in the direction in which the tube extends.

3. The liquid supplying apparatus according to claim 2, wherein the first wall has a screw part, the liquid container further includes a cap configured to be screwed with the screw part of the first wall, and a third length of the screw part in the direction in which the nozzle extends is greater than the second length.

4. The liquid supplying apparatus according to claim 1, wherein the liquid container further includes a key member, and the liquid supplying apparatus further includes a receiver key member corresponding to the key member.

5. The liquid supplying apparatus according to claim 4, wherein the tank includes the receiver key member.

6. The liquid supplying apparatus according to claim 4, further comprising a plurality of tanks including the tank, each of the plurality of tanks corresponding to a color of the liquid to be stored, wherein a position of the receiver key member is different with respect to each of the plurality of tanks, and the key member is positioned so that the key member is engaged to the receiver key member of one of the plurality of tanks corresponding to the key member.

7. The liquid supplying apparatus according to claim 4, wherein the key member is located in a space between the nozzle and the first wall.

8. The liquid supplying apparatus according to claim 7, wherein the key member is connected to the nozzle and the first wall.

9. The liquid supplying apparatus according to claim 7, wherein the key member is connected to the nozzle and is not connected to the first wall.

10. The liquid supplying apparatus according to claim 7, wherein the key member is not connected to the nozzle and is connected to the first wall.

11. The liquid supplying apparatus according to claim 7, wherein the key member extends outward from the first wall.

12. The liquid supplying apparatus according to claim 1, wherein an upper end of the first wall is located above a forward end of the nozzle.

13. The liquid supplying apparatus according to claim 4, further comprising:

a plurality of tanks including the tank, each of the plurality of tanks corresponding to a color of the liquid to be stored; and a plurality of receiver key members including the receiver key member, wherein the plurality of receiver key members have different shapes corresponding to the plurality of tanks, respectively, and the key member has a shape so that the key member is in conformity with the receiver key member of one of the plurality of tanks corresponding to the key member.

* * * * *